United States Patent
Park et al.

(10) Patent No.: US 11,825,360 B2
(45) Date of Patent: *Nov. 21, 2023

(54) UPLINK SELECTION FOR HANDOVER

(71) Applicant: Comcast Cable Communications, LLC, Philadelphia, PA (US)

(72) Inventors: Kyungmin Park, Vienna, VA (US); Esmael Hejazi Dinan, McLean, VA (US); Hyoungsuk Jeon, Centreville, VA (US); Hua Zhou, Vienna, VA (US); Alireza Babaei, Fairfax, VA (US); Ali Cagatay Cirik, Chantilly, VA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/724,147

(22) Filed: Apr. 19, 2022

(65) Prior Publication Data
US 2022/0240136 A1 Jul. 28, 2022

Related U.S. Application Data

(63) Continuation of application No. 16/277,692, filed on Feb. 15, 2019, now Pat. No. 11,343,728.
(Continued)

(51) Int. Cl.
*H04W 36/00* (2009.01)
*H04W 36/08* (2009.01)
*H04W 36/28* (2009.01)

(52) U.S. Cl.
CPC ... *H04W 36/0069* (2018.08); *H04W 36/0072* (2013.01); *H04W 36/00837* (2018.08); *H04W 36/08* (2013.01); *H04W 36/28* (2013.01)

(58) Field of Classification Search
CPC ....... H04W 36/0069; H04W 36/00837; H04W 36/0072; H04W 36/08; H04W 36/28
See application file for complete search history.

(56) References Cited

U.S. PATENT DOCUMENTS 7,839,827 B2    11/2010 Kwun et al.
8,477,737 B2 *   7/2013 Rao ................ H04W 36/04
                                                370/333
(Continued)

FOREIGN PATENT DOCUMENTS

EP    2664185 B1    6/2015
EP    3140945 A1    3/2017
(Continued)

OTHER PUBLICATIONS

May 10, 2019—Extended European Search Report—19157390.6.
(Continued)

*Primary Examiner* — Christopher M Crutchfield
*Assistant Examiner* — Tito Q Pham
(74) *Attorney, Agent, or Firm* — Banner & Witcoff, Ltd.

(57) ABSTRACT

Systems, apparatuses, and methods are described for wireless communications. A first base station may receive, from a second base station, parameters for a cell of the second base station. A handover to a selected uplink, of a plurality of uplinks of the cell, may be performed based on a threshold value associated with uplink selection among the plurality of uplinks and a measurement associated with a signal of the cell.

82 Claims, 27 Drawing Sheets

Related U.S. Application Data

(60) Provisional application No. 62/631,652, filed on Feb. 17, 2018.

(56) References Cited

U.S. PATENT DOCUMENTS

| | | | | |
|---|---|---|---|---|
| 8,892,099 | B2* | 11/2014 | He | H04W 36/0085 455/442 |
| 9,503,940 | B2* | 11/2016 | Huang | H04W 36/0061 |
| 9,781,721 | B1 | 10/2017 | Yeh | |
| 2011/0103328 | A1 | 5/2011 | Lee et al. | |
| 2011/0188472 | A1 | 8/2011 | Jeon et al. | |
| 2012/0028676 | A1* | 2/2012 | He | H04W 36/0016 455/517 |
| 2014/0036743 | A1 | 2/2014 | Olfat | |
| 2015/0092746 | A1* | 4/2015 | Jang | H04W 36/0094 370/331 |
| 2015/0181453 | A1 | 6/2015 | Chen et al. | |
| 2016/0302076 | A1 | 10/2016 | Chou et al. | |
| 2017/0135012 | A1 | 5/2017 | Zhang et al. | |
| 2017/0223736 | A1 | 8/2017 | Yi et al. | |
| 2018/0007603 | A1 | 1/2018 | Miranda et al. | |
| 2019/0327765 | A1 | 10/2019 | Mukherjee et al. | |
| 2020/0084806 | A1* | 3/2020 | Orsino | H04W 74/0833 |
| 2020/0305200 | A1* | 9/2020 | Jiang | H04W 36/0072 |

FOREIGN PATENT DOCUMENTS

| | | |
|---|---|---|
| EP | 2898724 B1 | 12/2017 |
| WO | 2014055878 A1 | 4/2014 |
| WO | 2016114623 A1 | 7/2016 |
| WO | 2018182385 A1 | 10/2018 |
| WO | 2019096020 A1 | 5/2019 |

OTHER PUBLICATIONS

3GPP TS 36.423: "X2 application protocol (X2AP)", Jun. 2016.
May 29, 2019—European Extended Search Report—19157418.5.
3GPP TSG-RAN WG2 #100: "Random Access procedure on SUL", Nov. 27, 2017.
3GPP TSG-RAN WG2 Meeting #99: "Considerations on support of supplementary uplink frequency", Aug. 21, 2017.
R2-1801038 3GPP TSG-RAN2 Meeting #AH-1801, Vancouver, BC, Canada, Jan. 22-26, 2018, Source: Huawei, HiSilicon, Title: Impact of SUL on configured grant.
R2-1800620 3GPP TSG-RAN WG2 NR Ad Hoc, Vancouver, Canada, Jan. 22-26, 2018, Source: Samsung, Title: Clarification on PHR for SUL.
R2-1800687 3GPP TSG-RAN WG2 Meeting NR Ad Hoc #1801, Vancouver, Canada, Jan. 22-26, 2018, Source: Ericsson, Title: Random Access Fallback to SUL.
3GPP TS 38.423 V0.6.0 (Jan. 2018), Technical Specification, 3rd Generation Partnership Project; Technical Specification Group Radio Access Network; NG-RAN; Xn application protocol (XnAP) (Release 15).
R2-1800069 3GPP TSG-RAN2 Meeting AH #1, Vancouver, Canada, Jan. 22-26, 2018, Source: OPPO, Xiaomi, Title: Remaining issues for duplication operation.
R2-1800231 3GPP TSG-RAN2 #100, Reno, Nevada, Nov. 27-Dec. 1, 2017, Source: Xiaomi, Title: Consideration on PHR Trigger Condition for Supporting SUL.
R2-1801338 3GPP TSG-RAN2 #100, Reno, Nevada, Nov. 27-Dec. 1, 2017, Source: Xiaomi, China Unicom, CMCC, OPPO, Potevio, TCL, vivo, Title: LCP restriction for PDCP duplication consideration for SUL.
R2-1800236 3GPP TSG-RAN2 NR AH-1801, Vancouver, Canada, Jan. 22-26, 2018, Source: Xiaomi, Title: Random access failure consideration for SUL.
R2-1801626 3GPP TSG-RAN2 NR AH #0118, Vancouver, BC, Canada, Jan. 22-26, 2018, Source: Qualcomm, Title: LS on NR Idle Mode Measurements.
R2-1800343 3GPP TSG-RAN WG2 #AH NR 1801, Vancouver, Canada, Jan. 22-26, 2018, Source: Ericsson, Title: PHR format for SUL.
R2-1800373 3GPP TSG-RAN WG2 NR Ad hoc 1801, Vancouver, Canada, Jan. 22-26, 2018, Source: Samsung Electronics R&D Institute UK, Title: Preventing simultaneous Type 1 configured grants on SUL and UL.
R2-1800374 3GPP TSG-RAN WG2 AH-1801, Vancouver, Canada, Jan. 22-26, 2018, Source: Samsung Electronics R&D Institute UK, Title: Corrections to prevent simultaneous Type 1 configured grants on SUL and UL.
R2-1800517 3GPP TSG-RAN WG2 #100, Vancouver, Canada, Jan. 22-26, 2018, Source: InterDigital Inc., Title: Random Access procedure on SUL.
R2-1800619 3GPP TSG-RAN WG2 NR Ad Hoc, Vancouver, BC, Canada, Jan. 22-26, 2018, Source: Samsung, Title: SUL and PHR.
R2-1800686 3GPP TSG-RAN WG2 NR AH #3, Vancouver, BC, Canada, Jan. 22-26, 2018, Source: Ericsson, Title: Random Access Fallback to SUL.
R2-1800795 3GPP TSG-RAN WG2 NR Ad hoc 1801, Vancouver, BC, Canada, Jan. 22-26, 2018, Source: CMCC, Title: Further consideration on RA-RNTI calculation with respect to the SUL.
R2-1800796 3GPP TSG-RAN WG2 NR Ad hoc 1801, Vancouver, BC, Canada, Jan. 22-26, 2018, Source: CMCC, Title: TP on RA-RNTI calculation related to SUL operation.
R2-1800818 3GPP TSG-RAN WG2 AH-1801, Vancouver, BC, Canada, Jan. 22-26, 2018, Source: Samsung Electronics R&D Institute UK, Title: Corrections to prevent simultaneous Type 1 configured grants on SUL and UL.
R2-1800819 3GPP TSG-RAN WG2 NR Ad hoc 1801, Vancouver, BC, Canada, Jan. 22-26, 2018, Source: Samsung Electronics R&D Institute UK, Title: Preventing simultaneous Type 1 configured grants on SUL and UL.
R2- 1800909 3GPP TSG-RAN WG2 Meeting NR Ad Hoc 1801, Vancouver, BC, Canada, Jan. 22-26, 2018, Source: Qualcomm Incorporated, Title: Summary for email discussion [100#32][NR] UE capabilities.
R2-1801081 3GPP TSG-RAN WG2 NR Ad hoc 1801, Vancouver, BC, Canada, Jan. 22-26, 2018, Source: ZTE, Title: Consideration on the configured grant for supporting SUL.
R2-1801111 3GPP TSG-RAN WG2 NR Ad Hoc 1801, Vancouver, BC, Canada, Jan. 22-26, 2018, Source: InterDigital Inc., Title: SUL Operation in NR Standalone.
R2-1801289 3GPP TSG-RAN WG2 NR Ad hoc 1801, Vancouver, BC, Canada, Jan. 22-26, 2018, Source: CMCC, Title: SUL impact on cell selection and reselection.
R2-1801463 3GPP TSG-RAN WG2 NR Ad hoc 1801, Vancouver, BC, Canada, Jan. 22-26, 2018, Source: MTI, Title: UL carrier switch considering SUL in RRC_CONNECTED.
R2-1801620 3GPP TSG-RAN WG2 NR Ad hoc 1801, Vancouver, BC, Canada, Jan. 22-26, 2018, Source: Qualcomm Incorporated, Title: UL-DL split for EN-DC band combination signalling.
R2-1801387 3GPP TSG-RAN WG2 Ad hoc 0118, Vancouver, BC, Canada, Jan. 22-26, 2018, Source: LG Electronics Inc., Title: Support of measurement for HO with SUL.
3GPP TS 38.213 V15.2.0 (Jun. 2018), Technical Specification, 3rd Generation Partnership Project; Technical Specification Group Radio Access Network; NR; Physical layer procedures for control (Release 15).
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
R1-1709897 3GPP TSG RAN WG1 NR Ad-hoc #2, Qingdao, P.R. China, Jun. 27-30, 2017, Source: ZTE, Title: 4-step random access procedure.
R1-1710035 3GPP TSG RAN WG1 NR Ad-Hoc #2, Qingdao, P.R. China, Jun. 27-30, 2017, Source: CATT, Title: Further details on NR 4-step RA Procedure.

(56) References Cited

OTHER PUBLICATIONS

R1-1710138 3GPP TSG RAN WG1 NR Ad-Hoc #2, Qingdao, P.R. China, Jun. 27-30, 2017, Source: Guangdong OPPO Mobile Telecom, Title: NR 4-Step Random Access Procedure.
R1-1710218 3GPP TSG-RAN WG1 NR Ad-Hoc #2, Qingdao, P.R. China, Jun. 27-30, 2017, Source: Mitsubishi Electric, Title: RACH transmission count.
R1-1710234 3GPP TSG-RAN WG1 NR Ad-Hoc #2, Qingdao, P.R. China, Jun. 27-30, 2017, Source: Fujitsu, Title: Discussion on 4-step RA procedure.
R1- 1710271 3GPP TSG RAN WG1 NR #2, Qingdao, P.R. China, Jun. 27-30, 2017, Source: LG Electronics, Title: RACH procedure.
R1-1710422 3GPP TSG RAN WG1 Ad hoc Meeting #2, Qingdao, P.R. China, Jun. 26-30, 2017, Source: AT&T, Title: DL Tx Beam Reporting in msg. 3.
R1-1710478 3GPP TSG RAN WG1 NR Ad-Hoc Meeting, Qingdao, P.R. China, Jun. 27-30, 2017, Source: Huawei, HiSilicon, Title: RACH procedures and resource configuration.
R1-1710513 3GPP TSG RAN WG1 NR Adhoc #2, Qingdao, P.R. China, Jun. 27-30, 2017, Source: Intel Corporation, Title: 4-step PRACH procedures.
R1- 1710636 3GPP TSG RAN WG1 Meeting NR AH #2, Qingdao, P.R. China, Jun. 27-30, 2017, Source: Samsung, Title: 4-step RACH procedure discussion.
R1-1710774 3GPP TSG RAN WG1 Meeting NR Adhoc, Qingdao, P.R. China, Jun. 27-30, 2017, Source: CMCC, Title: Discussion on RACH configuration.
R1-1710824 3GPP TSG RAN WG1 NR Ad-Hoc #2, Qingdao, P.R. China, Jun. 27-30, 2017, Source: MediaTek Inc., Title: On 4-step RACH procedure.
R1-1710860 3GPP TSG RAN WG1 NR Ad-Hoc #2, Qingdao, P.R. China, Jun. 27-30, 2017, Source: SONY, Title: Considerations on 4-step RA Procedure.
R1-1710871 3GPP TSG-RAN WG1 NR Ad-Hoc #2, Qingdao, P.R. China, Jun. 27-20, 2017, Source: InterDigital Inc., Title: Multiple Msg1 transmissions for one monitored RAR window.
R1-1710892 3GPP TSG RAN WG1 NR Ad-Hoc #2, Qingdao, P.R. China, Jun. 27-30, 2017, Source: Nokia, Alcatel-Lucent Shanghai Bell, Title: NR 4-step RACH procedure.
R1-1711068 3GPP TSG RAN WG1 NR Ad-Hoc #2, Qingdao, P.R. China, Jun. 27-30, 2017, Source: NTT Docomo, Inc., Title: Discussion on 4-step RA procedure for NR.
R1-1711148 3GPP TSG-RAN WG1 Meeting #89, Hangzhou, China, May 15-19, 2017, Source: Qualcomm Incorporated, Title: 4-step RACH procedure consideration.
R1-1711279 3GPP TSG RAN WG1 NR Ad-Hoc #2, Qingdao, P.R. China, Jun. 27-30, 2017, Source: Motorola Mobility, Lenovo, Title: RACH configuration and procedure.
R1-1711383 3GPP TSG RAN WG1 NR Ad-Hoc #2, Qingdao, P.R. China, Jun. 27-30, 2017, Source: Ericsson, Title: 4-step random access procedure.
Jan. 3, 2020—European Extended Search Report—EP 19191057.9.
LG Electronics Inc: "Support of SUL in EN-DC and Standalone NR HO" 3GPP Draft; R2-1713706, Nov. 17, 2017.
Samsung et al: "Supplementary uplink (SUL) information for NR cells over X2/Xn/F1", 3GPP Draft; Jan. 12, 2018.
May 3, 2021—European Office Action—EP 19157390.6.
Feb. 6, 2023—EP Office Action—EP App. No. 19157390.6.

\* cited by examiner

User Plane Protocol Stack

Control Plane Protocol Stack

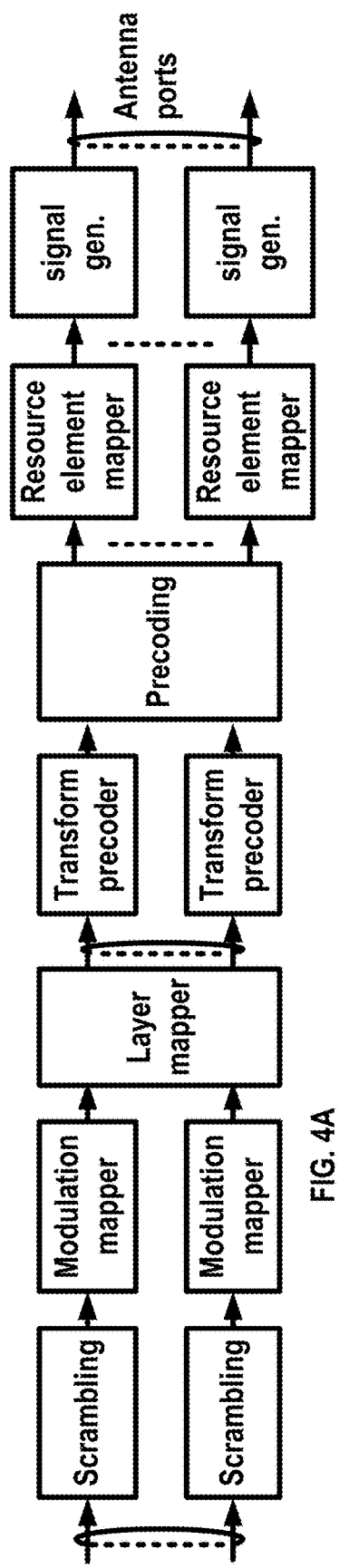
FIG. 4A
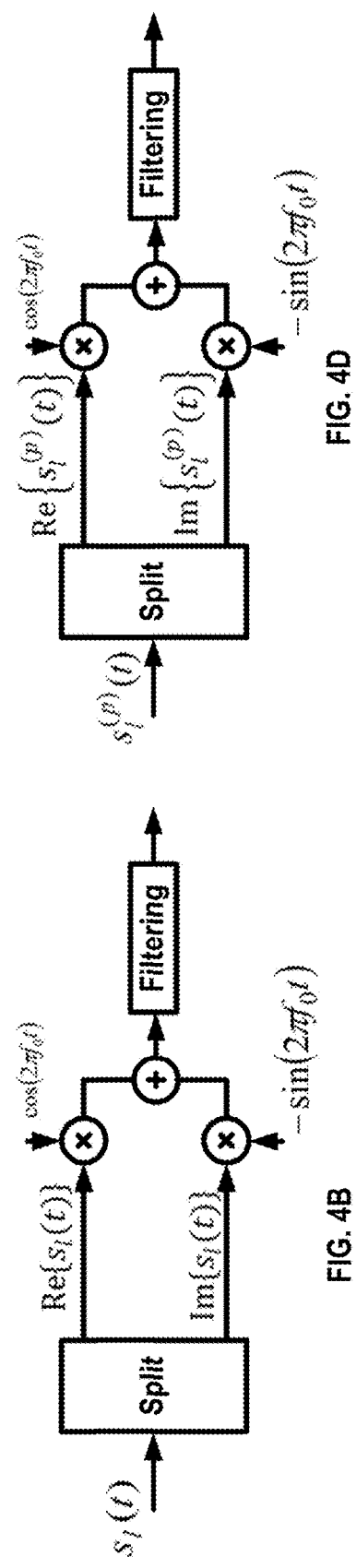
FIG. 4B
FIG. 4D
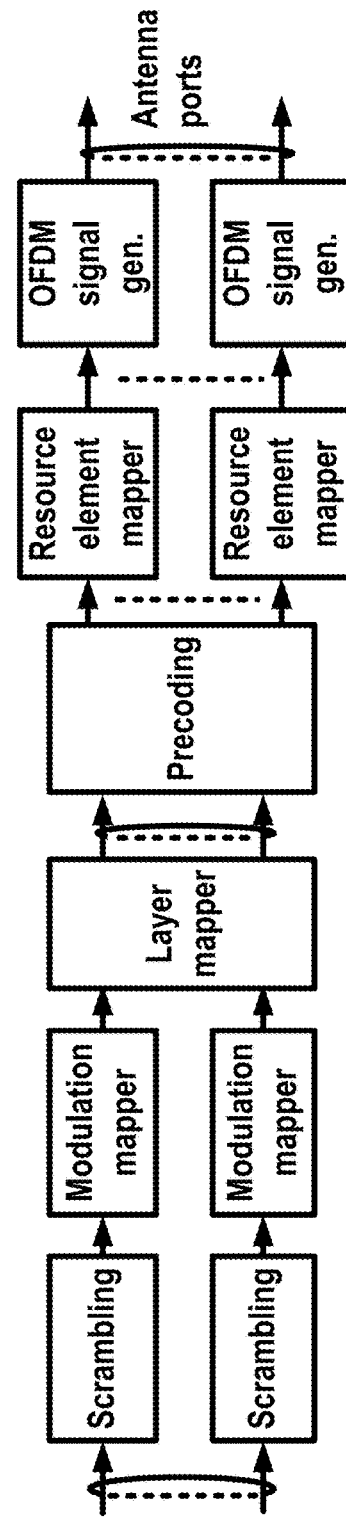
FIG. 4C

UPLINK SELECTION FOR HANDOVER

CROSS-REFERENCE TO RELATED APPLICATIONS

This application is a continuation of U.S. application Ser. No. 16/277,692, filed on Feb. 15, 2019, which claims the benefit of U.S. Provisional Application No. 62/631,652, filed on Feb. 17, 2018. The above-referenced applications are hereby incorporated by reference in their entirety.

BACKGROUND

A wireless device may not successfully communicate, perform a handover, initiate dual connectivity, or the like due to a variety of reasons, such as an inefficient radio resource configuration, call dropping, radio link failure, interference with other communications, and/or timing errors. It is desired to improve wireless communications by increasing the likelihood for a successful handover or dual connectivity initiation procedure by a wireless device, without adversely increasing signaling overhead and/or decreasing spectral efficiency.

SUMMARY

The following summary presents a simplified summary of certain features. The summary is not an extensive overview and is not intended to identify key or critical elements.

Systems, apparatuses, and methods are described for wireless communications. A first base station may receive, from a second base station, parameters for a selection of an uplink of a cell of the second base station. The one or more parameters may comprise a power value, a load status value, an interference value, etc. The selected uplink may comprise a supplemental uplink. Communications, such as for example, a handover procedure, a dual connectivity initiation procedure, associated with the selected uplink may be performed based on the parameters and a measurement associated with a signal of the cell.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C and FIG. 4D show examples of uplink and downlink signal transmission.

DETAILED DESCRIPTION

Figure 1:
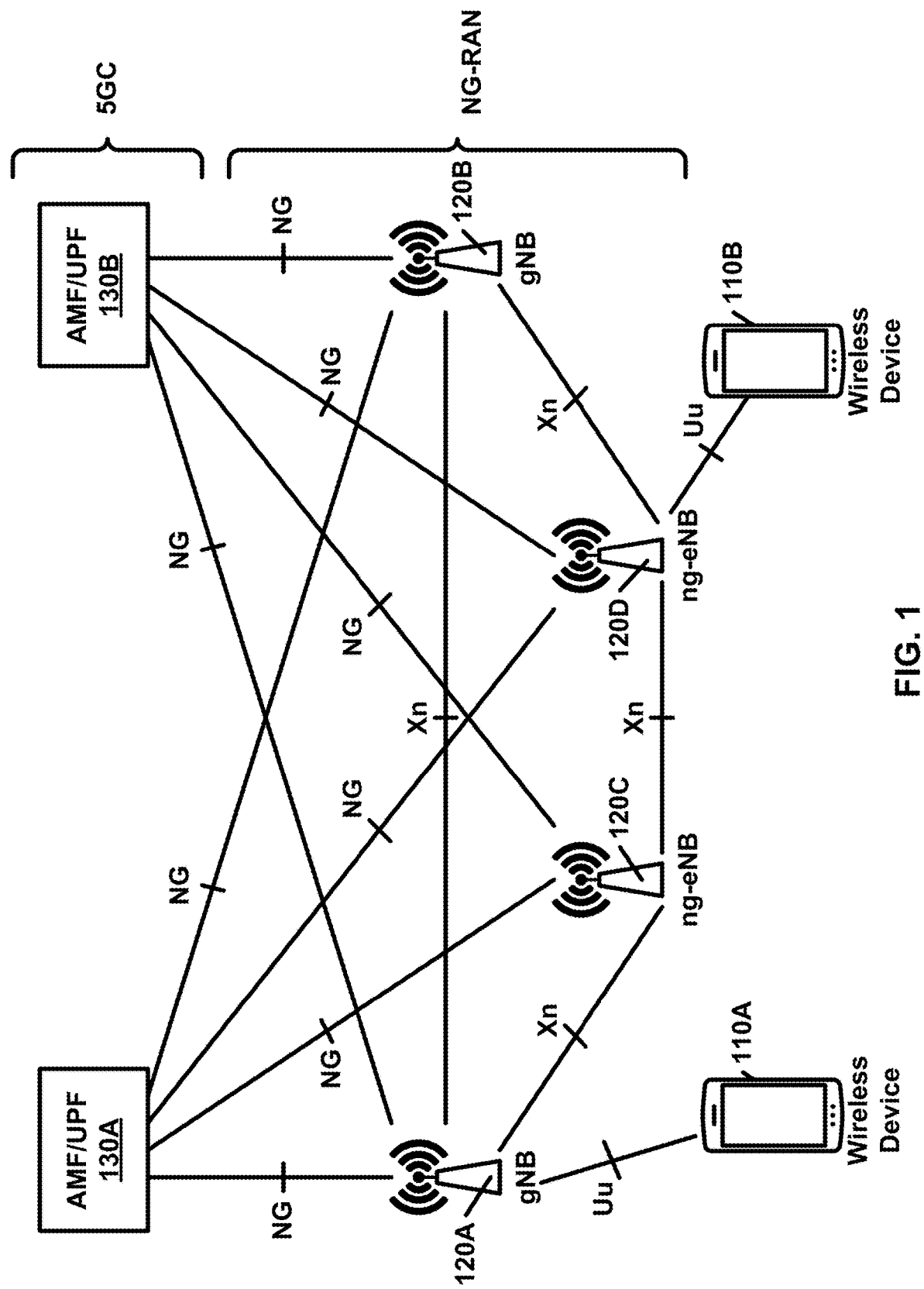
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to wireless communication systems in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., an gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
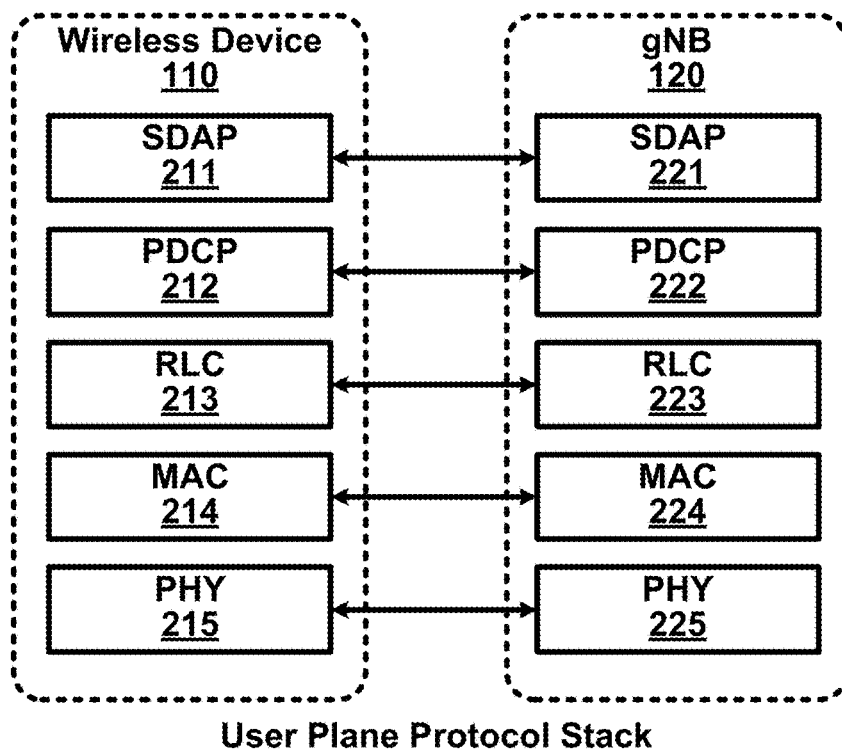
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Media Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
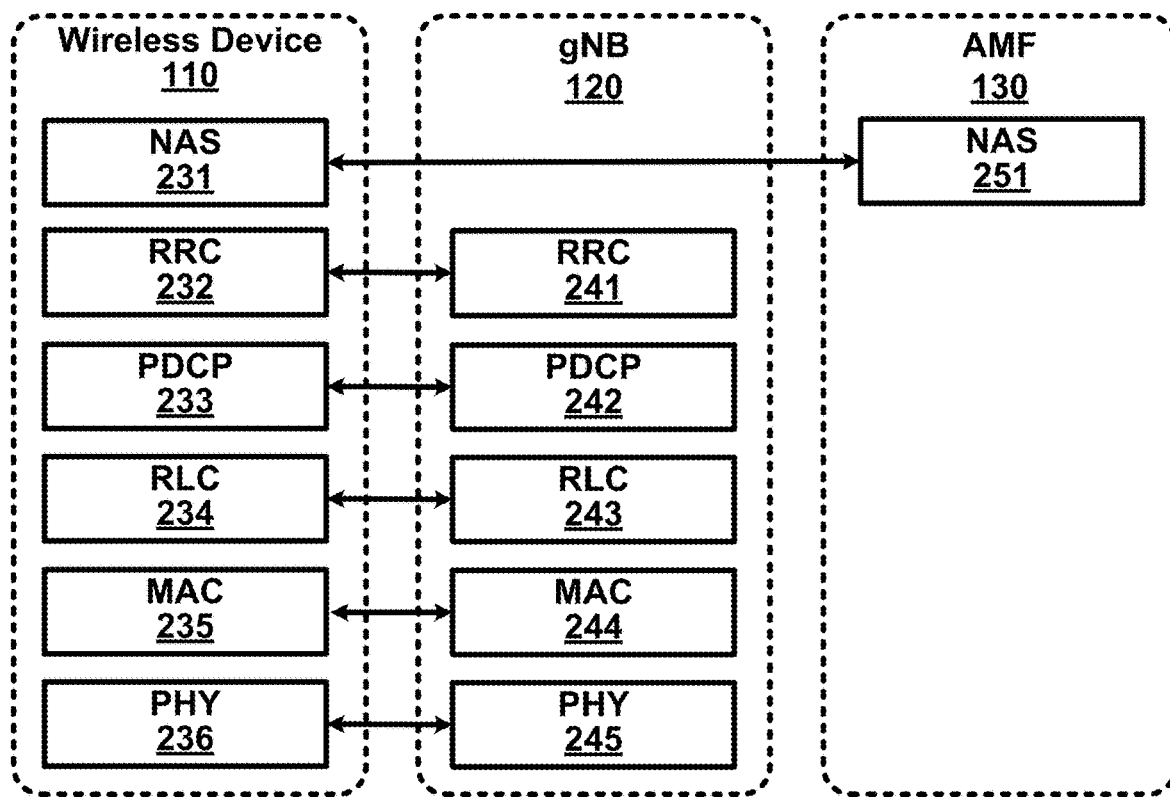
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MA CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
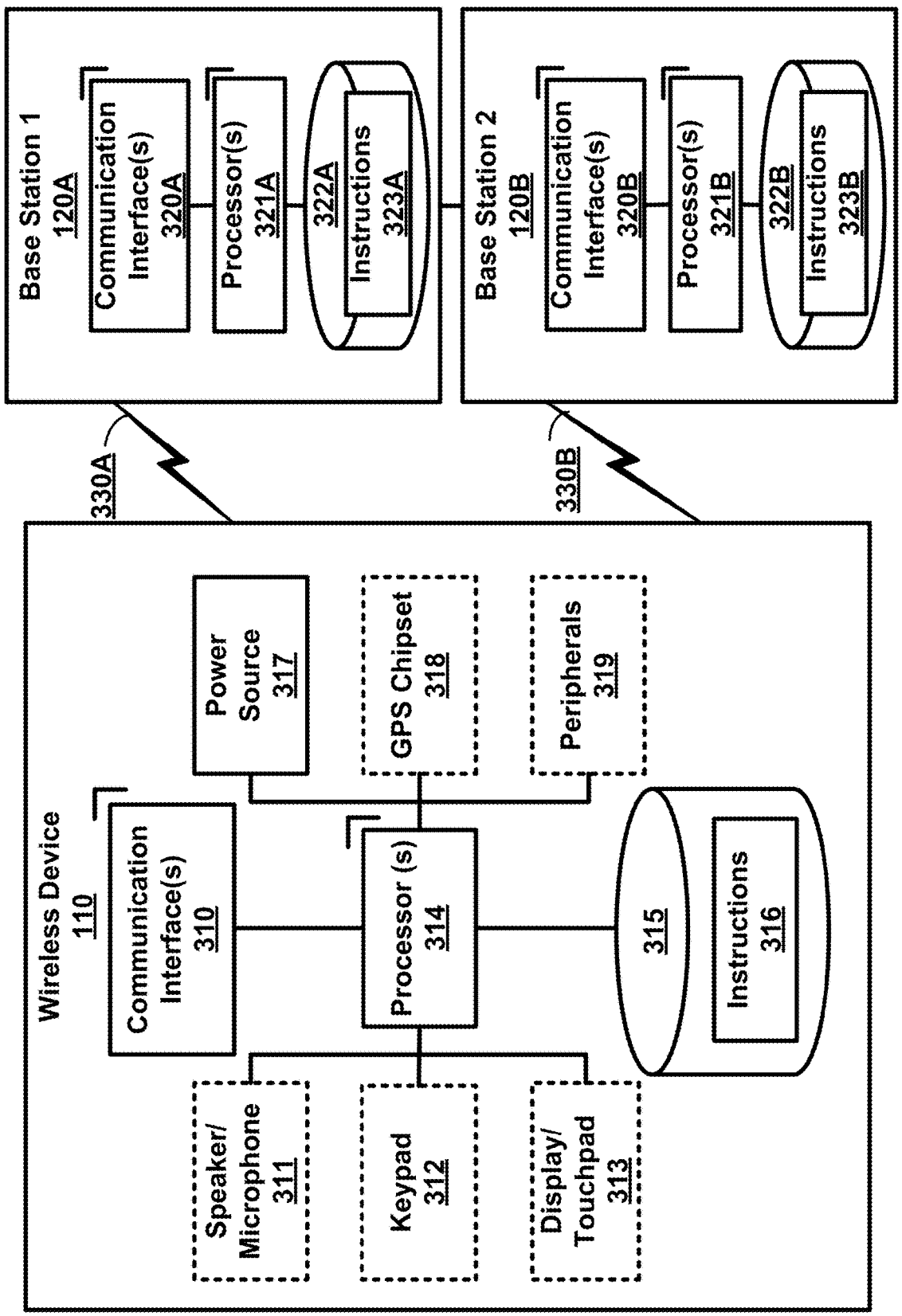
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signalling may be used for the request and delivery of the other SI. For the wireless device in the RRC_Idle state and/or in the RRC_Inactive state, the request may trigger a random-access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., only static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to a E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multicarrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. An CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
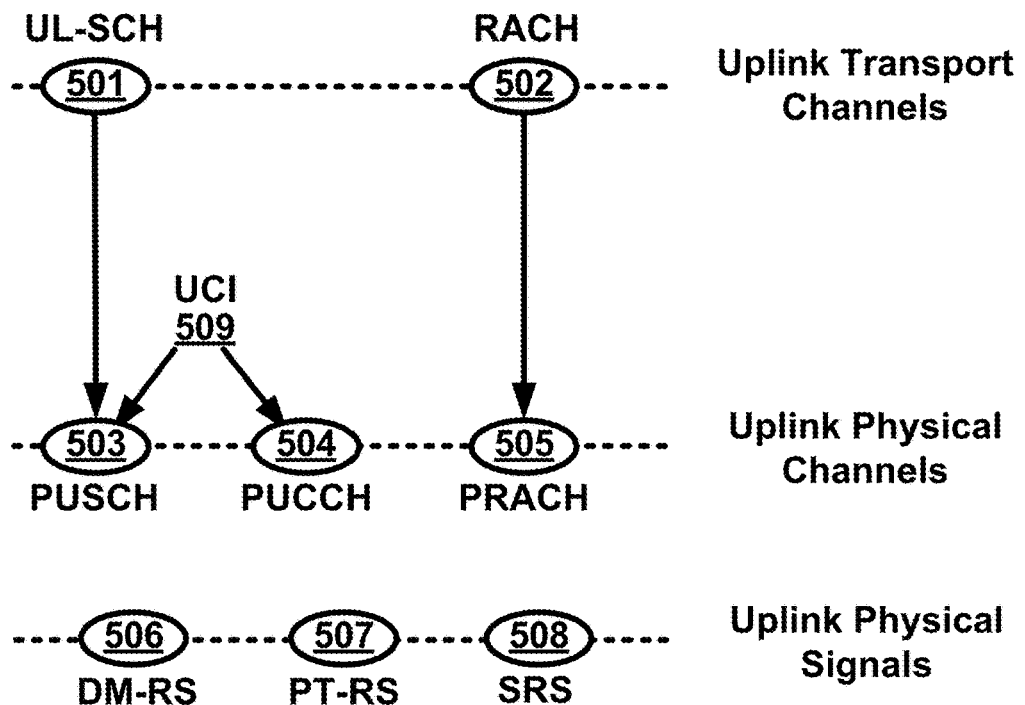
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be fewer than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
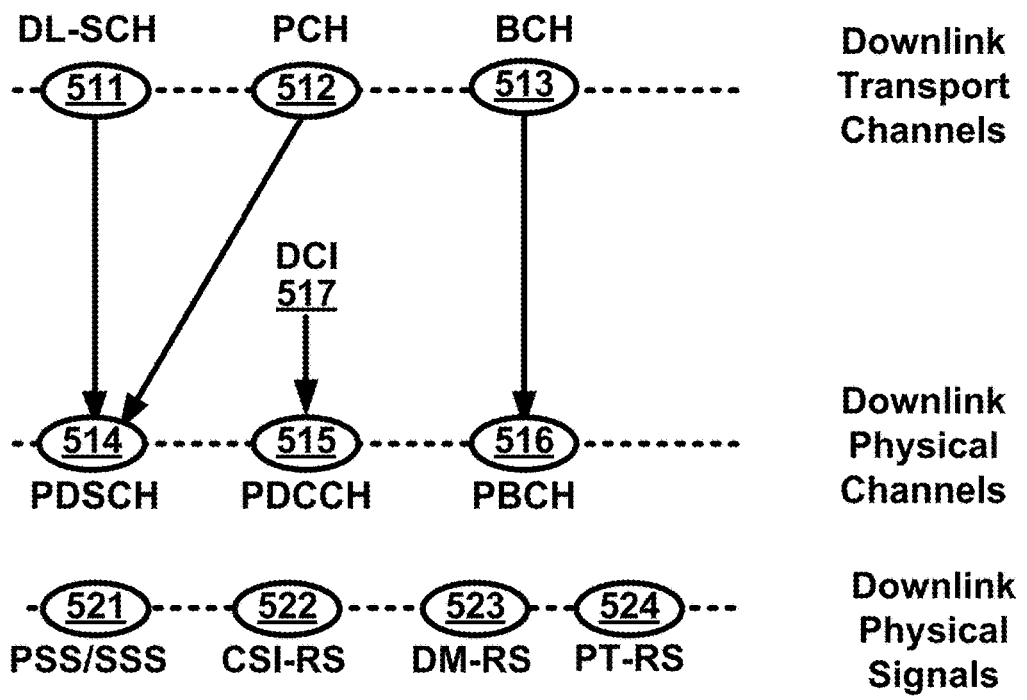
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SSB/PBCH, for example, if the downlink CSI-RS 522 and SSB/PBCH are spatially quasi co-located and resource elements associated with the downlink CSI-RS 522 are outside of the PRBs configured for the SSB/PBCH.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. ADM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
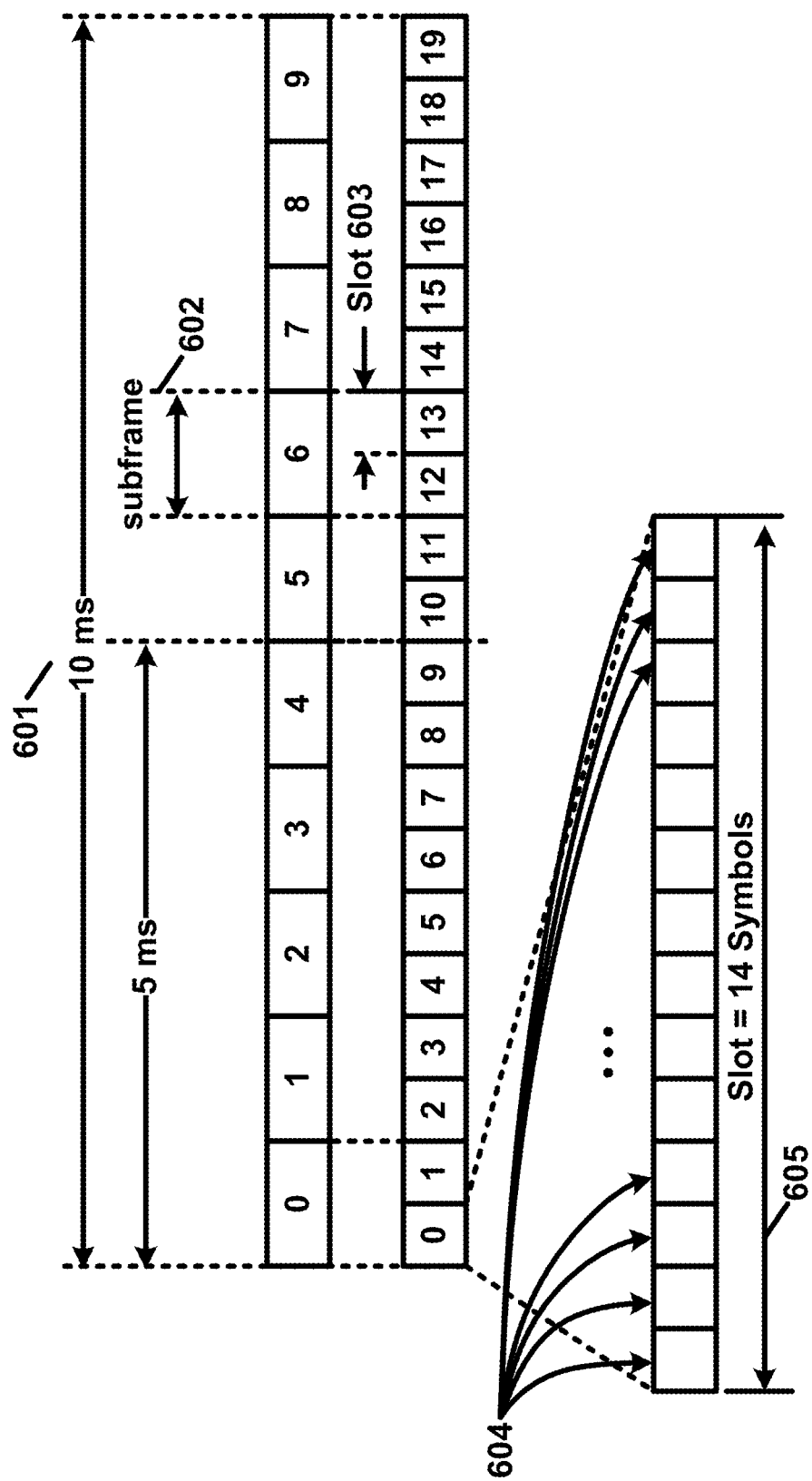
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
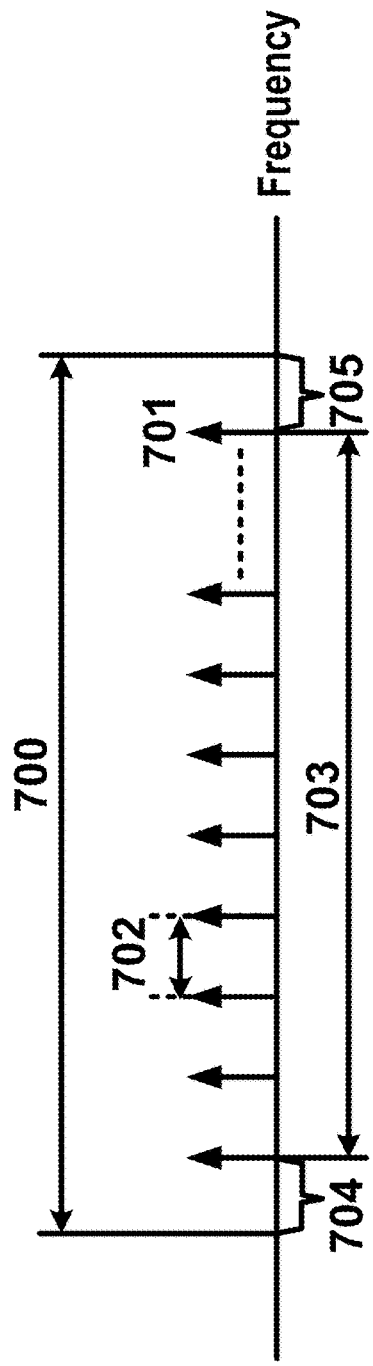
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
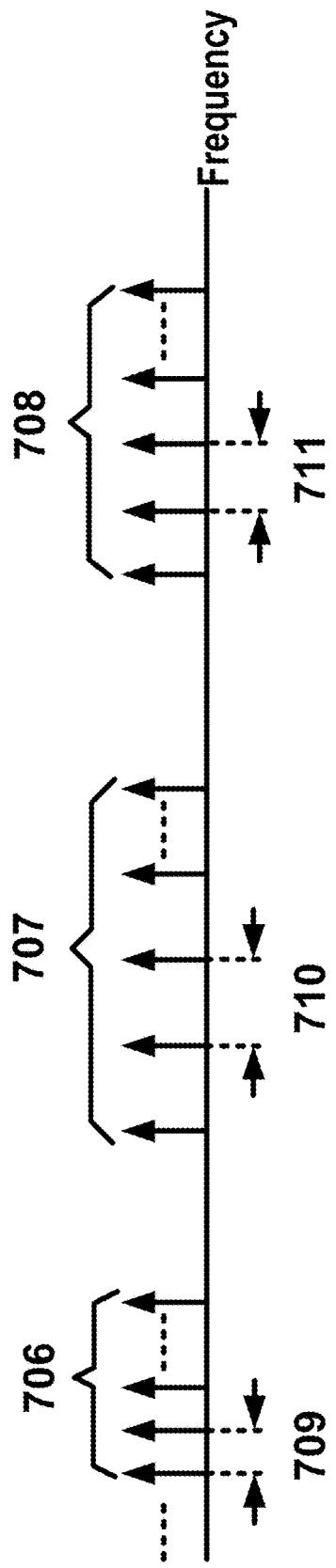

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
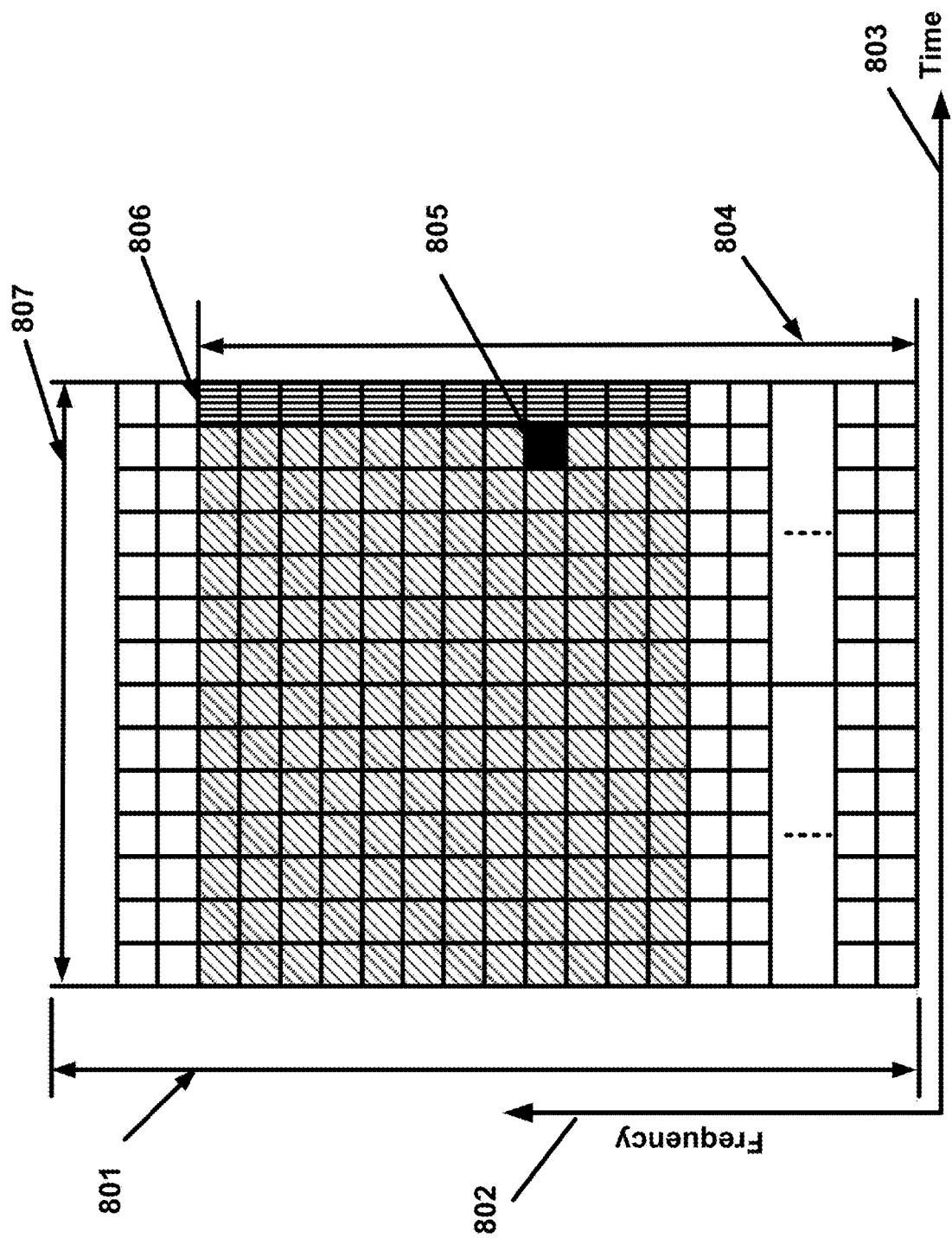
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

a base station may allocate Configured Scheduling (CS) resources for down link transmission to a wireless device. The base station may send (e.g., transmit) one or more RRC messages indicating a periodicity of the CS grant. The base station may send (e.g., transmit) a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) a DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) a DCI comprising a slot format indicator (SFI) indicating a slot format. The base station may send (e.g., transmit) a DCI comprising a pre-emption indication indicating the PRB(s) and/or OFDM symbol(s) in which a wireless device may assume no transmission is intended for the wireless device. The base station may send (e.g., transmit) a DCI for group power control of the PUCCH, the PUSCH, and/or an SRS. A DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
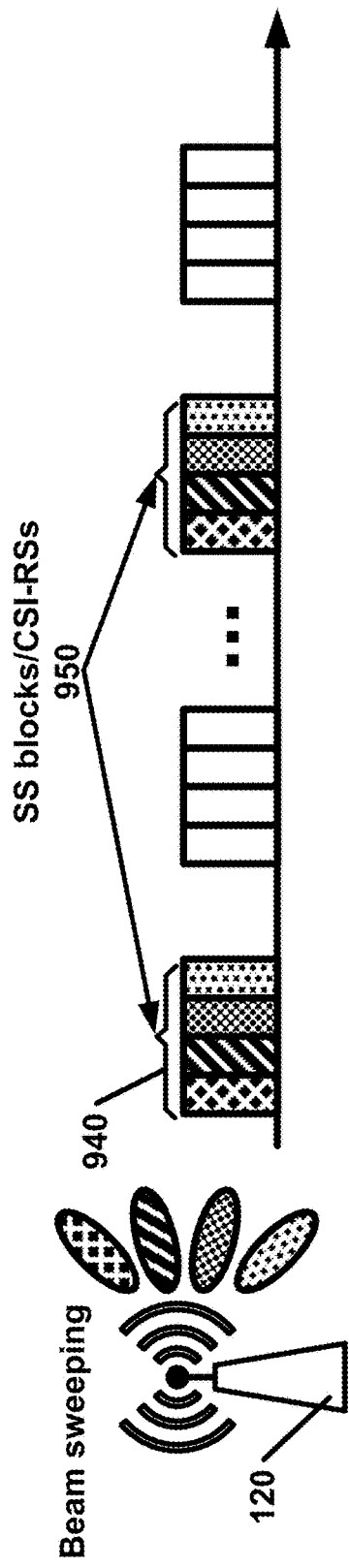
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
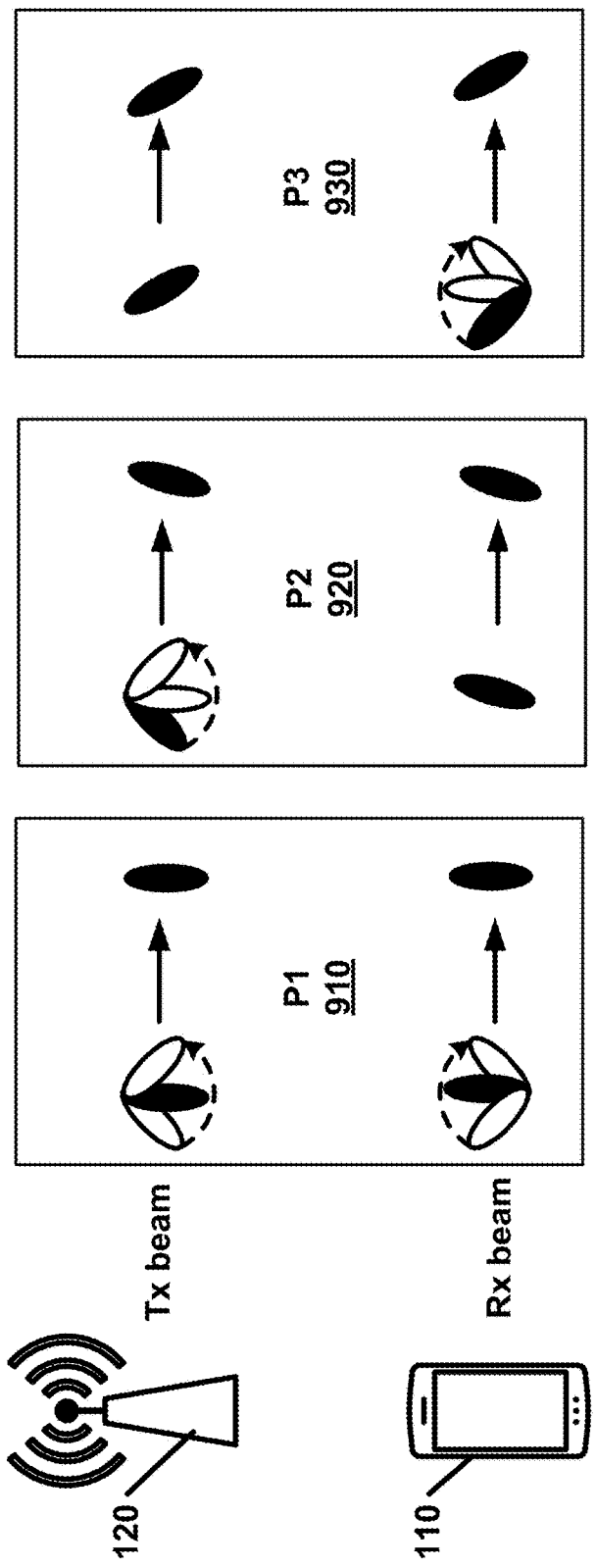
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth (s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
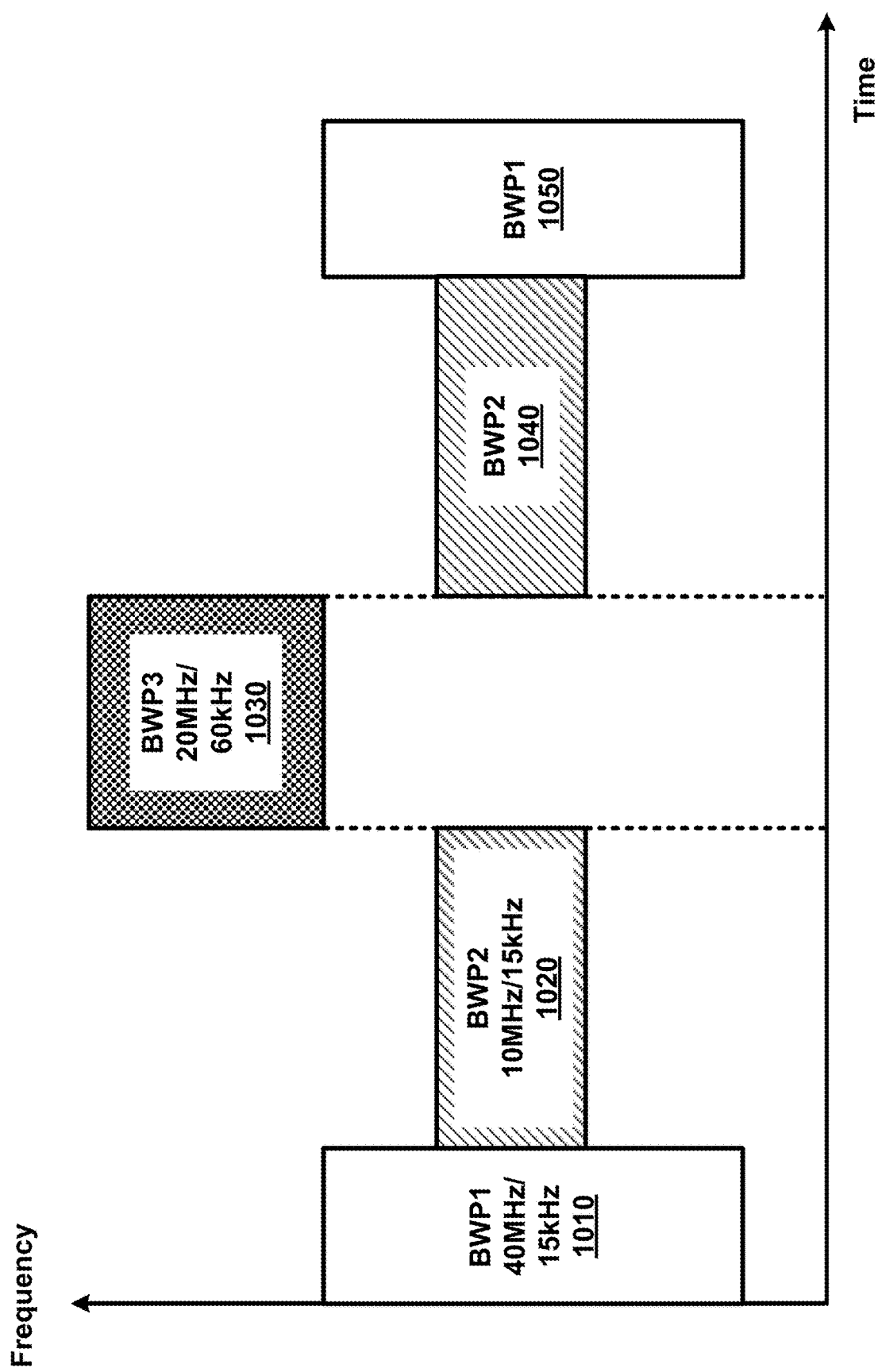
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base statin may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

A DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects a DCI indicating an active DL BWP, other than a default DL BWP, for a paired spectrum operation, and/or if a wireless device detects a DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect a DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving a DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving a DCI indicating BWP3 1030 as an active BWP. Switching an active BWP from BWP3 1030 to BWP2 1040 and/or from BWP2 1040 to BWP1 1050 may be after or in response to receiving a DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
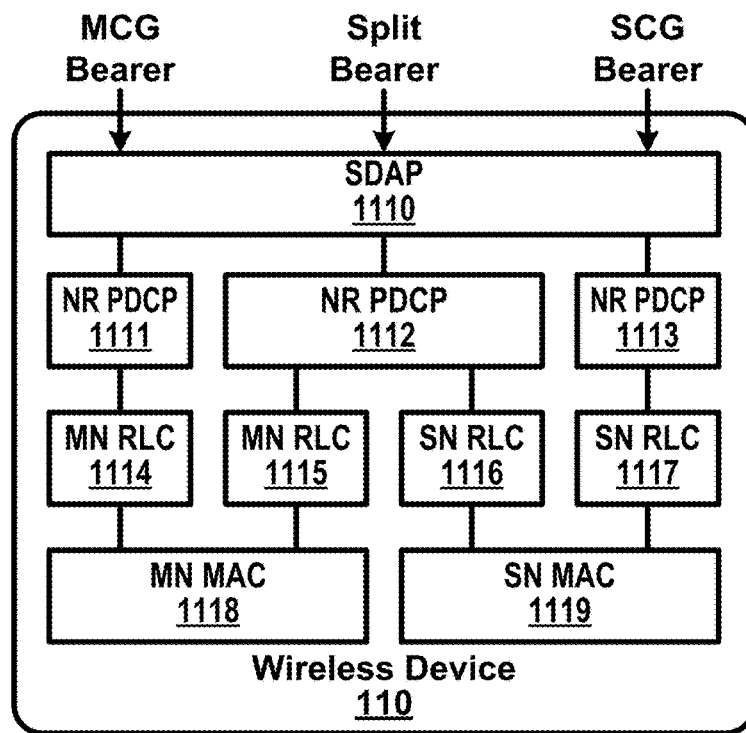
FIG. 11A, and FIG. 11B show examples of multi connectivity.
Figure 11B:
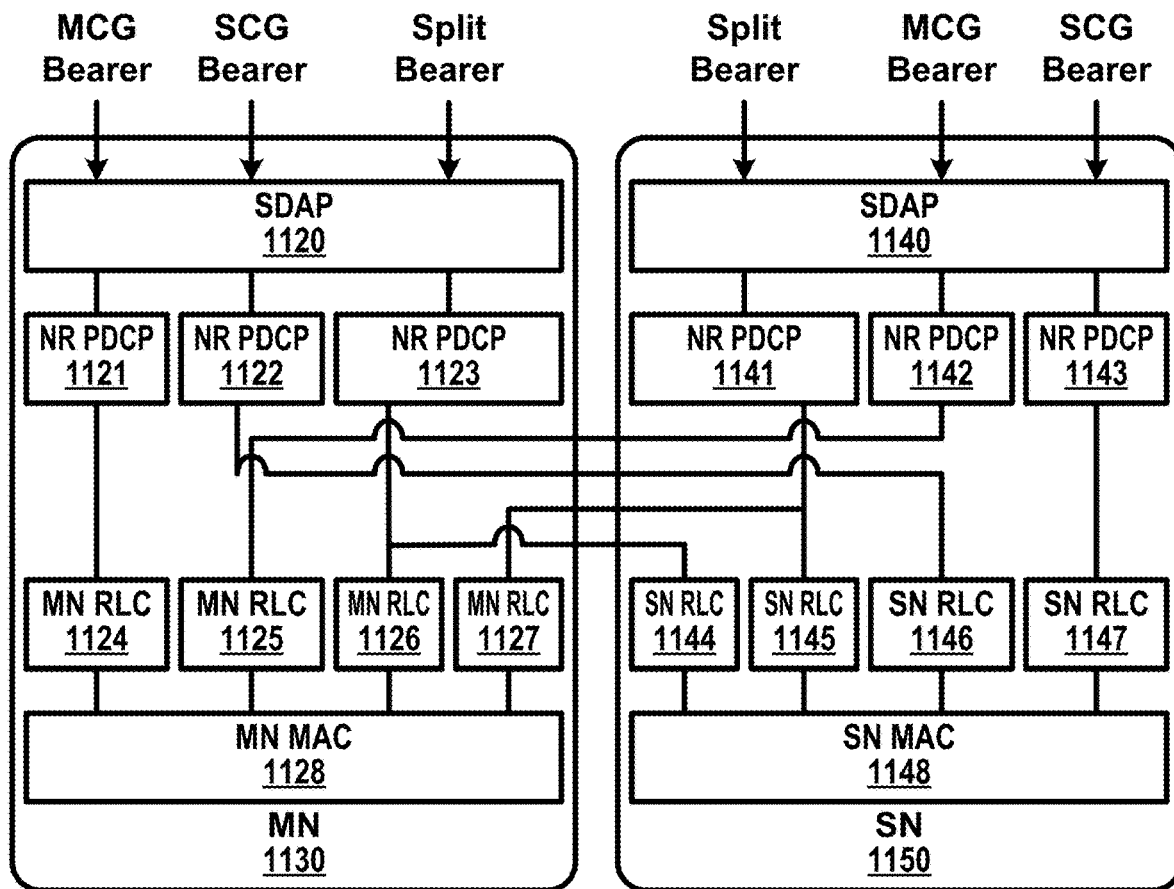

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
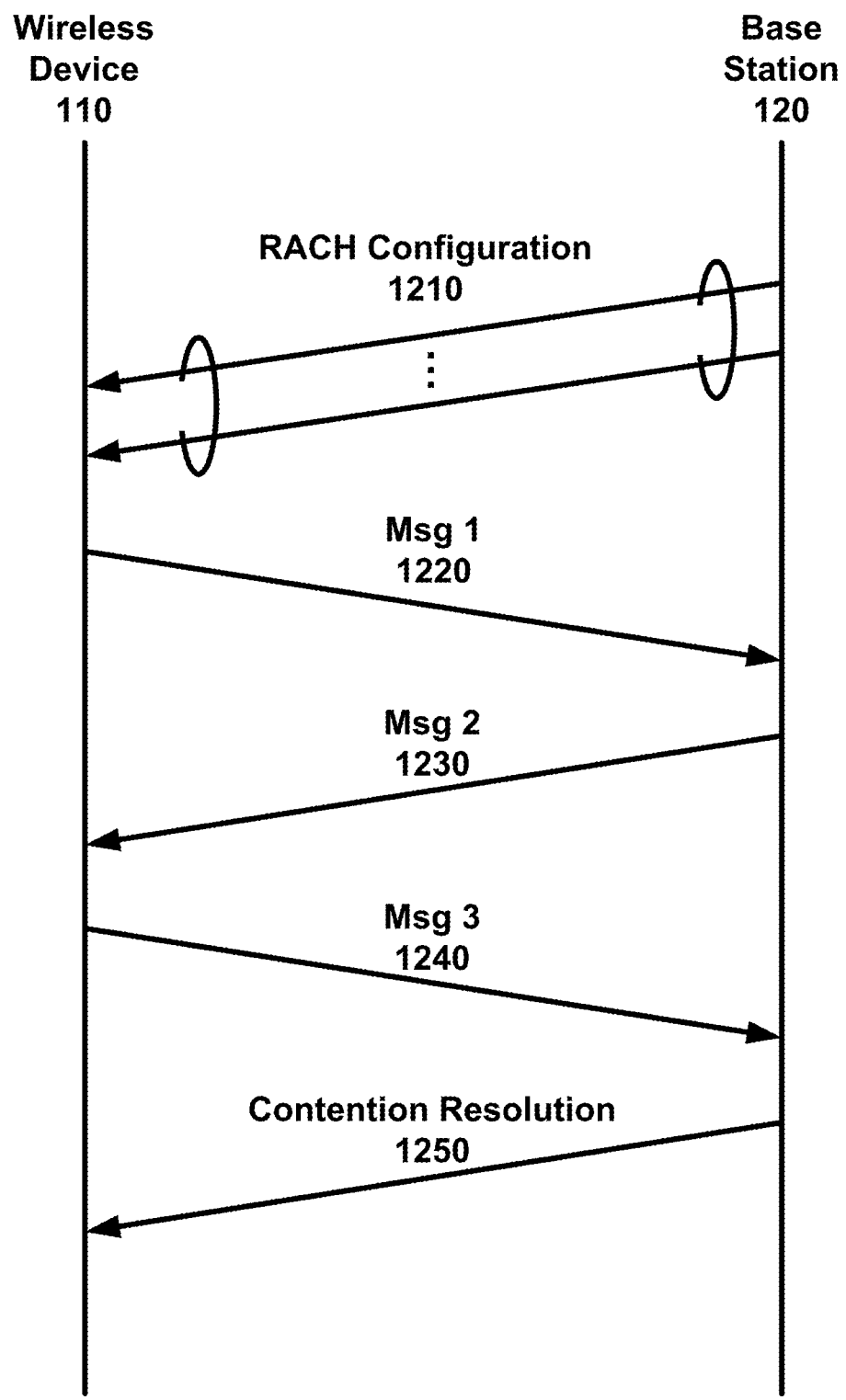
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for beam failure recovery request and corresponding PRACH resource(s) (e.g., if any), a time window to monitor RA response(s), a time window to monitor response(s) on beam failure recovery request, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for beam failure recovery request associated with at least one of SS blocks and/or CSI-RSs. A wireless device may select a random access preamble index corresponding to a selected SS block or a CSI-RS from a set of one or more random access preambles for beam failure recovery request, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine an PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For beam failure recovery request, the base station may configure the wireless device with a different time window (e.g., bfr-ResponseWindow) to monitor response on beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises only a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
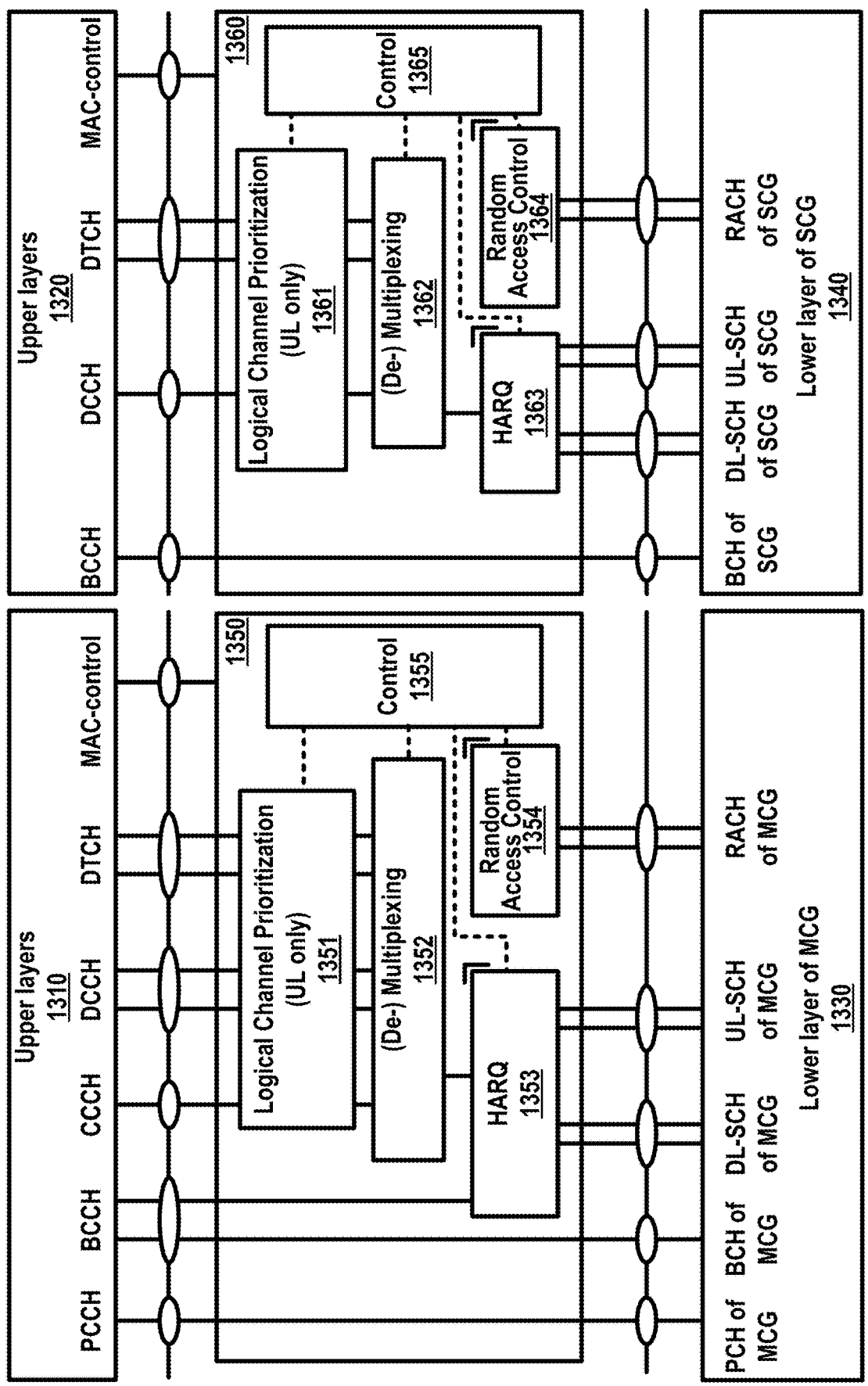
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization

1361). A MAC entity may handle a random access process (e.g., Random Access Control 1354 and/or Random Access Control 1364).

Figure 14:
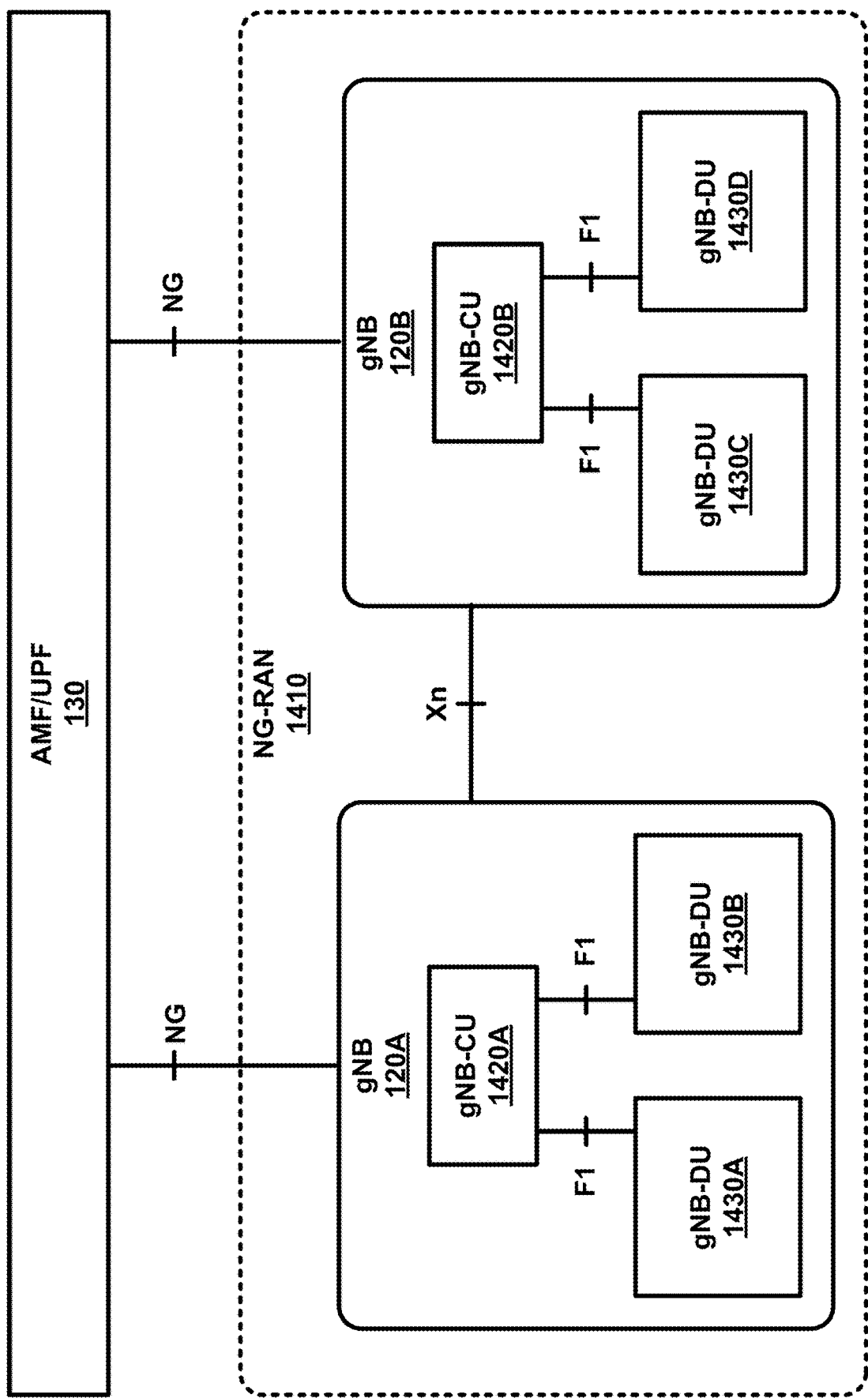
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
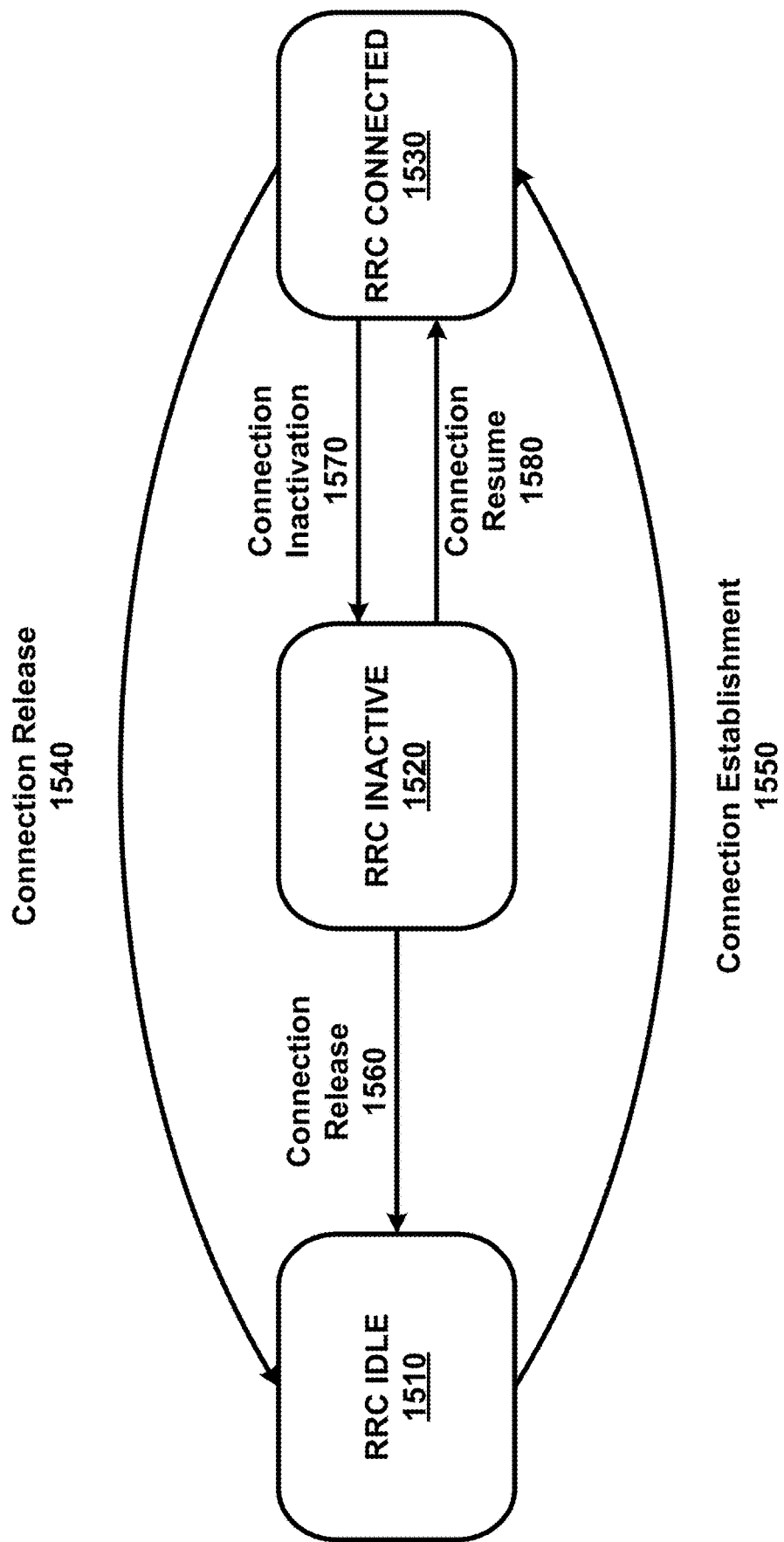
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4 stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

In communications, such as for example, backhaul signaling (e.g., X2, Xn), some of the cell configuration parameters, such as frequency, bandwidth, channel, and core network parameters, may be exchanged among base stations. Base stations may exchange information about load, power and/or interference. Inefficiency and/or other problems in a handover procedure, a dual-connectivity procedure, and/or a cell radio configuration may occur, for example, if an improved backhaul signaling scheme is not provided for a supplemental uplink carrier that is configured for a cell. Increased call dropping and/or handover/dual-connectivity delays (e.g., due to connection re-establishment processes) may be caused by legacy signaling mechanisms, for example, if a supplementary uplink carrier is configured. A rate of unsuccessful random access process completion may increase during a handover and/or dual-connectivity procedure, for example, if a supplementary uplink carrier is configured. Uplink congestion may occur, for example, if a supplementary uplink carrier is configured and many wireless devices attempt to use a limited uplink resource. A configuration of a supplemental uplink carrier for a cell may benefit from a further enhancement in communication mechanisms among base stations (e.g., enhanced backhaul signaling). A handover and/or dual connectivity procedure may benefit from a further enhancement of base station configuration parameters, for example, if a supplementary uplink carrier is configured. An enhanced information exchange mechanism among base stations (e.g., an enhanced mechanism for exchanging radio resource status information) may also improve handover efficiency and base station radio configuration, for example, if a supplementary uplink carrier is configured.

A base station may send, to a neighboring base station, a first power value (e.g., a threshold, a power threshold, an RSRP threshold, a broadcasted threshold, etc.) for a wireless device (e.g., a UE). The power value may be used for a selection of one of a first uplink (e.g., a first uplink carrier, a first uplink BWP, a first uplink resource, a first uplink channel, etc.) or a second uplink (e.g., a second uplink carrier, a second uplink BWP, a second uplink resource, a second uplink channel, etc.) of a selected cell for an uplink transmission (e.g., for an initial access, for a random access preamble transmission, for a scheduling request transmission, for a beam recovery request preamble transmission, etc.). A neighboring base station receiving the first power value associated with the first uplink and second uplink carriers may determine one or more radio resource configuration parameters based on the uplink configuration parameters. A base station may configure a cell configuration parameter based on a first uplink load and a second uplink load of the cell. A base station may configure a cell configuration parameter based on a threshold to select one of the non-supplemental uplink and supplementary uplink carriers of a selected cell, for example, if the supplementary uplink carrier is configured. The communication of one or more parameters and/or information, such as for example, a power value, a load status value, an interference value, etc., may enhance communications among devices, for example, by providing one or more devices to efficiently balance a load of one or more uplink resources, by making more efficient communication decisions (e.g., determining an efficient handover timing, selecting an efficient uplink carrier for handover and/or dual connectivity), etc.

The neighboring base station may make a handover decision for a wireless device based on a measurement threshold, such as the first power value, (e.g., an RSRP threshold) for a selection of one of the non-supplemental uplink and supplementary uplink carriers of a selected cell, for example, if the supplementary uplink carrier is configured. The neighboring base station may initiate a multi-connectivity (e.g., dual-connectivity, tight interworking, etc.) for a wireless device based on a measurement threshold (e.g., the RSRP threshold) to select one of the non-supplemental uplink and supplementary uplink carriers of a selected cell, for example, if the supplementary uplink carrier is configured. One or more base station configuration parameters described herein may enhance efficiency (e.g., handover efficiency, dual-connectivity efficiency), for example, if the supplementary uplink carrier is configured. Information exchange among base stations (e.g., an exchange of radio resource status information) may also be enhanced to improve handover efficiency and base station radio configuration, for example, if the supplementary uplink carrier is configured. A base station may send, to a neighboring base station, radio resource status information for uplink carriers of a first cell, (e.g., for a load balancing purpose; and/or a random access preamble resource for a first uplink carrier and a second uplink carrier of the first cell, for interference mitigation of preamble resources, etc.).

Uplink carriers may belong to different cells, (e.g., a first cell may be configured with a first uplink carrier and a second cell may be configured with a second uplink carrier). A first cell identifier may be configured for the first cell. The first cell may comprise a downlink carrier and a normal uplink carrier. A second cell identifier may be configured for the second cell. The second cell may comprise a supplemental uplink carrier. The second cell may or may not comprise a downlink carrier. The first cell and the second cell may belong to a same base station or different base stations. A selection between the first uplink carrier of the first cell and the second uplink carrier of the second cell may be made based on one or more parameters (e.g., the first power value, load statuses of uplink carriers of a cell, etc.). A source base station (e.g., a serving base station) may receive a parameter (e.g., the first power value, load statuses of uplink carriers of a cell, etc.) from a target base station. The target base station may provide the source base station with information of the first uplink carrier of the first cell and information of the second uplink carrier of the second cell. The source base station may receive, from a wireless device, a first measurement associated with a downlink carrier of the first cell and/or a second measurement associated with a downlink carrier of the second cell. The source base station may compare the parameter with a parameter (e.g., RSRP) of the first measurement report and/or may compare the parameter with a parameter (e.g., RSRP) of the second measurement report. The source base station may decide, based on at least one of the comparisons, a handover, to the first cell, via the first uplink carrier of the first cell or the second uplink carrier of the second cell. The source base station may send, to the target base station, a handover request for a handover of the wireless device to a target cell of the target base station. The handover request may comprise an indication of a selection between the first uplink carrier and the second uplink carrier.

The source base station may send, to the target base station (e.g., via a handover request for the wireless device), one or more measurements associated with the downlink carrier of the first cell and/or one or more measurements associated with the downlink carrier of the second cell. The target base station may select, for a handover of the wireless device and based on the one or more received measurements, the first uplink carrier of the first cell or the second uplink carrier of the second cell. The target base station may inform the source base station of the uplink carrier selection (e.g., via a handover response). The handover response may comprise information of the selected uplink carrier (e.g., one or more RRC messages, one or more resources of the selected uplink carrier, etc.). The source based station may send, to the wireless device and based on the uplink carrier selection made by the target base station, a handover command to cause the wireless device to perform a handover to the first cell or the second cell.

A base station may send, to a neighboring base station, uplink configuration parameters of uplink carriers (e.g., a first uplink carrier and a second uplink carrier) of a first cell. The uplink configuration parameters may comprise a first power value (e.g., a threshold, a power threshold, an RSRP threshold, a broadcasted threshold) for a wireless device to select one of the first uplink carrier and the second uplink carrier for an uplink transmission (e.g., for an initial access, for a random access preamble transmission, for a scheduling request transmission, for a beam recovery request preamble transmission, etc.). A neighboring base station receiving the uplink configuration parameters may determine one or more radio resource configuration parameters based on the uplink configuration parameters. A base station may configure a cell configuration parameter based on a first uplink load of the cell (e.g., an uplink load associated with the first uplink carrier) and a second uplink load of the cell (e.g., an uplink load associated with the second uplink carrier). A base station may configure a cell configuration parameter based on a threshold (e.g., a load threshold) to select one of the first uplink carrier and a second uplink carrier of a selected cell. A base station may configure a cell configuration parameter to cause a wireless device to select a non-supplemental uplink carrier of a selected cell, for example, if a load status of a supplemental uplink carrier satisfies a load threshold (e.g., the load status of the supplemental uplink carrier indicates that the supplemental uplink carrier is crowded with too many wireless devices). The load status of an uplink carrier may comprise a resource status of the uplink carrier (e.g., a resource assignment status, a resource assignment ratio, a status of unassigned available resources, etc.)

The neighboring base station may make a handover decision for a wireless device based on the uplink configuration parameters. The neighboring base station may make a handover decision for a wireless device based on a threshold to select one of the non-supplemental uplink carrier (e.g., normal uplink carrier) and the supplementary uplink carrier of a selected cell, for example, if the supplementary uplink carrier is configured. The neighboring base station may initiate a multi-connectivity (e.g., dual-connectivity, tight interworking) based on the uplink configuration parameters. A base station may make a dual connectivity decision for a wireless device based on a threshold to select one of the non-supplemental uplink carrier (e.g., normal uplink carrier) and the supplementary uplink carrier of a selected cell, for example, if the supplementary uplink carrier is configured.

Figure 16:
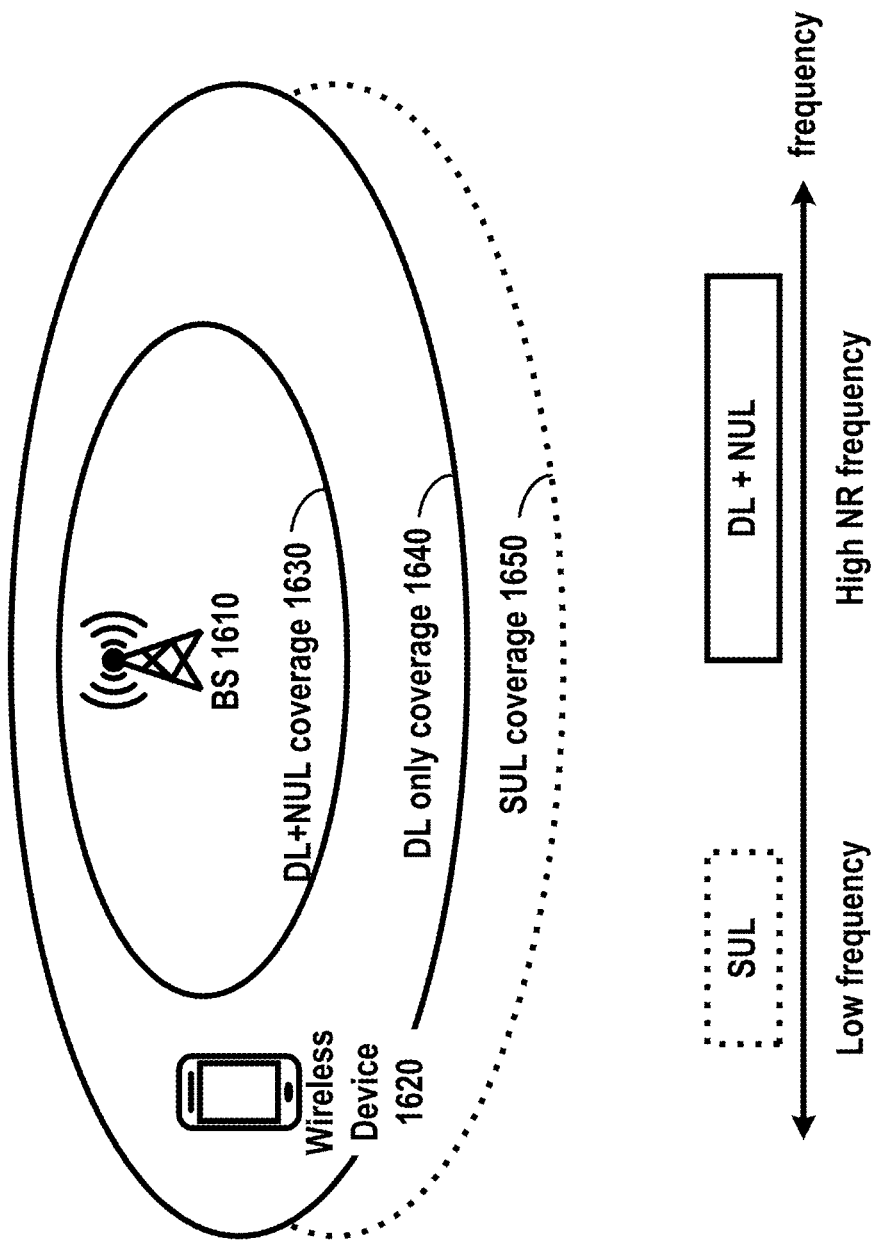
FIG. 16 shows an example of a cell coverage using a plurality of carriers.

FIG. 16 shows an example of a cell coverage using a plurality of carriers. A base station may configure a normal uplink (e.g., NUL, non-supplementary uplink) and a supplementary uplink (SUL) for a cell. The SUL may use different frequency and/or bandwidth from the NUL. To improve uplink coverage for high frequency scenarios, an SUL may be configured (e.g., as shown in FIG. 16). A wireless device (e.g., a wireless device 1620 shown in FIG. 16) may be configured with two uplinks (e.g., one NUL and one SUL) for one downlink of one cell of a base station (e.g., a BS 1610 shown in FIG. 16). Uplink transmissions on the two uplinks may be controlled by a network (e.g., a network comprising the BS 1610) to avoid overlapping physical uplink shared channel (PUSCH) transmissions in time (e.g., a PUSCH transmission via the NUL and a PUSCH transmission via the SUL may not overlap in time). An initial access may be supported in each of the two uplinks. For an initial access in a cell configured with an SUL, a wireless device may select an SUL carrier, for example, if a measured quality of downlink is lower than a broadcast threshold (e.g., a first threshold, an RSRP threshold, a power threshold, a first power value). Uplink transmissions of a random access procedure may remain on a selected carrier (e.g., one of the NUL carrier and the SUL carrier), for example, after an initial access on the selected carrier. The downlink (DL) carrier and the NUL carrier of the cell may have a high frequency (e.g., a frequency greater than 6 GHz). The SUL carrier of the cell may have a low frequency (e.g., a frequency less than 6 GHz). The coverage of the NUL carrier (e.g., DL and NUL coverage) 1630 may be smaller than the coverage of the DL carrier 1640 or the coverage of the SUL carrier 1650. The BS 1610 may not successfully receive and decode an uplink signal sent from the wireless device 1620 via the NUL, for example, if the wireless device 1620 is located outside of the NUL coverage. The SUL carrier may be used for the wireless device 1620 to send an uplink signal to the BS 1610 for a successful communication.

Figure 17:
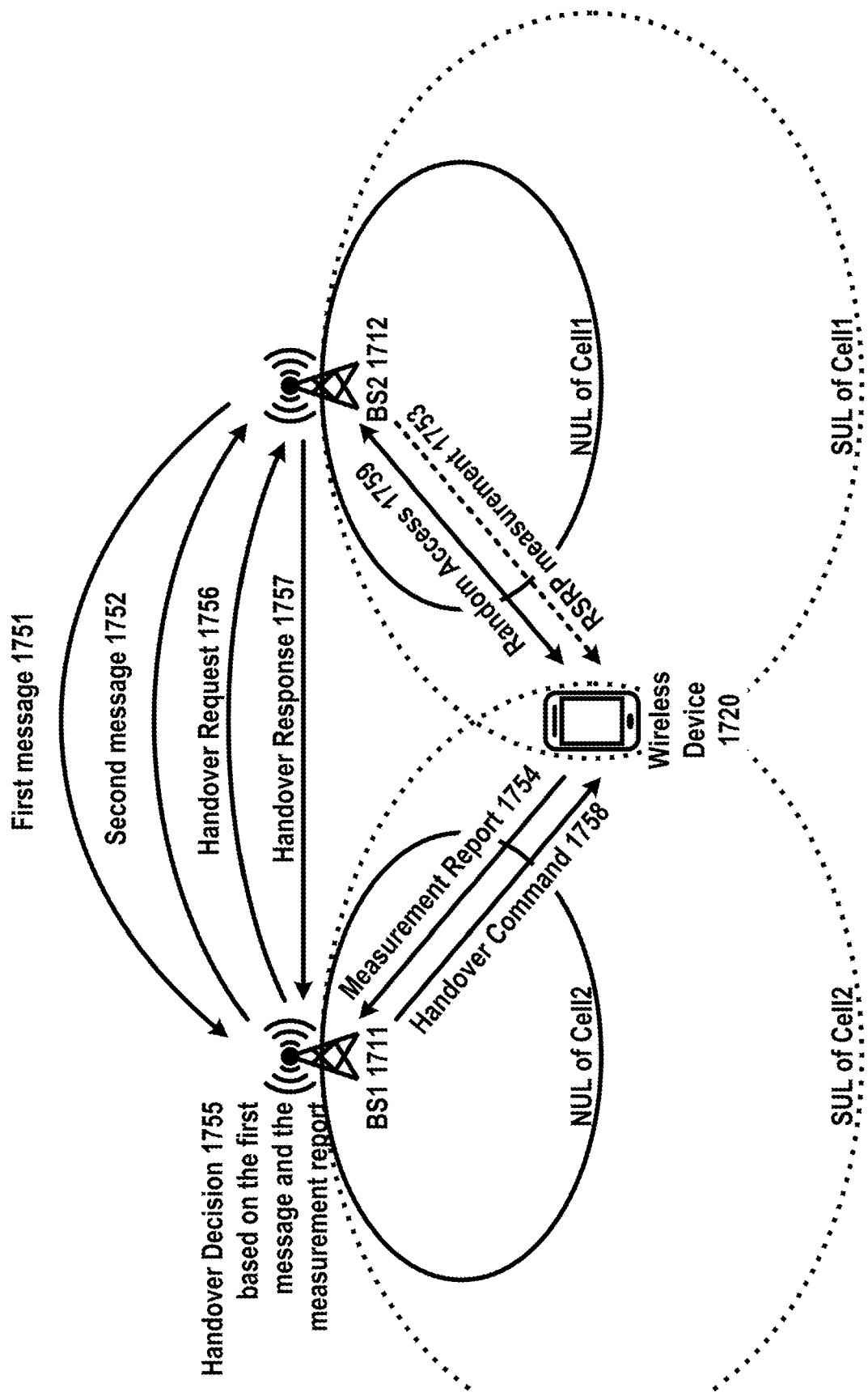
FIG. 17 shows an example of a handover procedure or a secondary node addition/modification procedure.
Figure 18:
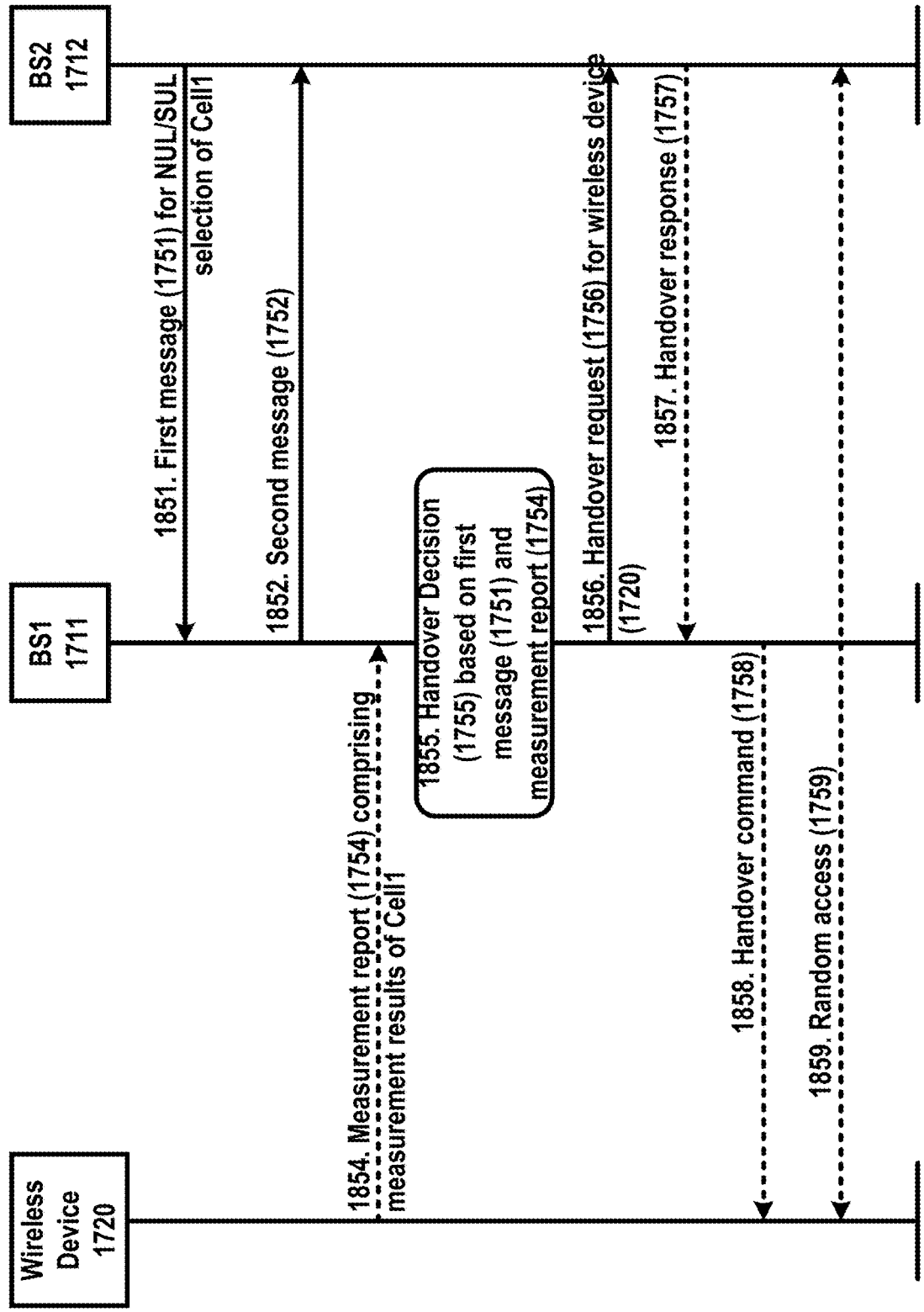
FIG. 18 shows an example of a handover procedure.

FIG. 17 shows an example of a handover procedure (or a secondary node addition/modification procedure). FIG. 18 shows an example of a handover procedure. At step 1851, a first base station 1711 (BS1 1711: e.g., a first gNB, a first eNB, etc.) may receive, from a second base station 1712 (BS2 1712: e.g., a second gNB, a second eNB, etc.), a first message 1751 comprising uplink configuration parameters for a first cell (Cell1) of the BS2 1712. The BS1 1711 may receive the first message 1751 via a direct interface (e.g., Xn interface, X2 interface, and/or the like) between the BS1 1711 and the BS2 1712. The BS1 1711 may receive, from the BS2 1712, the uplink configuration parameters via at least one indirect interface (e.g., N2 interface, NG interface, S1 interface, and/or the like) and at least one core network entity (e.g., AMF, MME, and/or the like). The first message 1751 may comprise at least one of an Xn setup request message, an Xn setup response message, an NG-RAN node configuration update message, an X2 setup request message, an X2 setup response message, an eNB configuration updated message, and/or the like. The uplink configuration parameters may comprise a UL absolute radio frequency channel number (ARFCN), a UL transmission bandwidth, and/or SUL information for FDD configurations. The uplink configuration parameters may comprise an ARFCN, a transmission bandwidth, and/or SUL information for TDD configurations.

The first message 1751 may comprise at least one of a first cell identifier of the Cell1, downlink configuration parameters of a first downlink of the Cell1; a base station identifier of the BS2 1712 (e.g., a global NG-RAN node ID, a global gNB ID, a global ng-eNB ID, a global eNB ID); one or more cell identifiers of one or more cells (e.g., other than the Cell1), one or more cell configuration parameters of the one or more cells, one or more neighbor cell information of one or more neighbor cells of the one or more cells (e.g., NR cells and/or E-UTRA cells), a core network pool information (e.g., AMF pool information, MME pool information), tracking area information, and/or the like. The global ng-eNB ID may comprise at least one of a macro ng-eNB ID, a short macro ng-eNB ID, and/or a long macro ng-eNB ID.

The one or more cell configuration parameters (e.g., served cells NR IE, served cell E-UTRA IE, served cell information of one or more served cell) of the one or more cells may comprise configuration parameters of one or more served cells indicating at least one of: a cell identifier (e.g., a physical cell identifier, global cell identifier), one or more PLMN identifiers, FDD configuration information (e.g., uplink ARFCN, downlink ARFCN, uplink transmission bandwidth, downlink transmission bandwidth), TDD configuration information (e.g., ARFCN, transmission bandwidth), SUL information (e.g., SUL ARFCN, SUL transmission bandwidth), and/or the like.

The one or more neighbor cell information (e.g., neighbor information NR IE, neighbor information E-UTRA IE) of one or more neighbor cells of the one or more cells may comprise configuration parameters of one or more neighbor cells indicating at least one of a cell identifier (e.g., a physical cell identifier, global cell identifier), one or more PLMN identifiers, FDD configuration information (e.g., uplink ARFCN, downlink ARFCN, uplink transmission bandwidth, downlink transmission bandwidth), TDD configuration information (e.g., ARFCN, transmission bandwidth), SUL information (e.g., SUL ARFCN, SUL transmission bandwidth), and/or the like.

The BS2 1712 may transmit the uplink configuration parameters via one or more system information to one or more wireless devices (e.g., in RRC idle/inactive state) and/or via one or more RRC messages to one or more wireless devices (e.g., in RRC connected state). The BS2 1712 may send (e.g., transmit or broadcast/multicast), to one or more wireless devices, at least one system information block comprising one or more elements of the uplink configuration parameters. One or more wireless devices receiving the at least one system information may send (e.g., transmit), to the BS2 1712 and based on the uplink configuration parameters, one or more random access preambles via the NUL carrier or via the SUL carrier. The first power value (e.g., an RSRP threshold, a power threshold, a first threshold, a broadcast threshold) may be determined. A wireless device may transmit a random access preamble via the NUL carrier, for example, if a received power (e.g., 12 dB) from the Cell1 is larger than the first power value (e.g., 10 dB).

The BS2 1712 and/or the BS1 1711 may configure one or more uplink scheduling resources for one or more wireless devices based on measurement reports (e.g., a CSI report, an RRM measurement report) from the one or more wireless devices.

The uplink configuration parameters may indicate at least one of: a first frequency/bandwidth of a first uplink (e.g., NUL) carrier, a second frequency/bandwidth of a second uplink (e.g., SUL) carrier, SUL information, a first power value (e.g., an RSRP threshold, a power threshold, a first threshold, a broadcast threshold) for a selection of one of the first uplink carrier and the second uplink carrier, etc. The first uplink carrier may use a higher frequency than the second uplink carrier.

The first frequency/bandwidth may comprise frequency information (e.g., UL ARFCN, an uplink frequency offset) and/or bandwidth information (e.g., UL transmission bandwidth) of the first uplink carrier. The frequency information may comprise an integer value (e.g., from 0 to 65535) indicating a frequency offset of the first uplink carrier. The bandwidth information may comprise an integer value (e.g., from 0 to 65535) indicating a bandwidth of the first uplink carrier.

The second frequency/bandwidth may comprise frequency information (e.g., SUL ARFCN, a supplementary uplink frequency offset) and/or bandwidth information (e.g., SUL transmission bandwidth) of the second uplink carrier. The frequency information may comprise an integer value (e.g., from 0 to 65535) indicating a frequency offset of the second uplink carrier. The bandwidth information may comprise an integer value (e.g., from 0 to 65535) indicating a bandwidth of the second uplink carrier.

The first power value may indicate a received power threshold for a selection of one of the first uplink (e.g., NUL) carrier and the second uplink (e.g., SUL) carrier. A wireless device may select the SUL carrier for an initial access in the Cell1, for example, if a measured downlink quality of the Cell1 is equal to or lower than (or lower than) the first power value. A wireless device may select the NUL carrier for an initial access in the Cell1, for example, if a measured downlink quality of the Cell1 is greater than (or equal to or greater than) the first power value. The first power value may be at least one of a threshold, a power threshold, an RSRP threshold, a broadcasted threshold, and/or the like. The first power value may indicate a power value in dB scale. The BS2 1712 may send (e.g., transmit) the first power value via one or more system information to one or more wireless devices (e.g. in RRC idle/inactive state) and/or via one or more RRC messages to one or more wireless devices (e.g. in RRC connected state).

The uplink configuration parameters may indicate multiple power values (e.g., multiple RSRP thresholds, multiple power thresholds, multiple first thresholds, multiple broadcast thresholds) for different types of wireless devices. The multiple power values may be used by URLLC wireless devices (e.g., high reliability requiring service wireless devices) and/or by non-URLLC wireless devices (e.g., non-high reliability requiring service wireless devices). First one of the multiple power values may be used by a URLLC service wireless device. Second one of the multiple power values may be used by a non-URLLC service wireless device. A URLLC service wireless device may require ultra-reliable service quality, so that by enabling a URLLC service wireless device to use a low frequency uplink (e.g., the SUL) carrier, the URLLC service wireless device may have reliable uplink connection. The first one of the multiple power values (e.g., 3 dB threshold) for URLLC service wireless devices may have larger value than the second one of the multiple power values (e.g., 2 dB threshold) for non-URLLC service wireless devices. A URLLC service wireless device may select the SUL carrier, for example, if a received power (e.g., a measured downlink quality) of the URLLC service wireless device is 2.5 dB (because 2.5 dB is smaller than the 3 dB threshold). A non-URLLC service wireless device may select the NUL carrier, for example, if a received power of the non-URLLC service wireless device is 2.5 dB (because 2.5 dB is larger than the 2 dB threshold).

The multiple power values may be used by high-speed wireless devices and/or by non-high-speed wireless devices. Third one of the multiple power values may be used by a high-speed wireless device. Fourth one of the multiple power values may be used by a non-high-speed wireless device. A high-speed wireless device may pass through a small coverage in a relatively short time period than a non-high-speed wireless device. By enabling a high-speed wireless device to use a low frequency uplink (e.g. the SUL) carrier, which may have larger coverage, the high-speed wireless device may have an uplink connection at a cell for a long time period and may have a reliable uplink connection. A wireless device may have high possibility of a connection failure (e.g., a radio link failure, a handover failure) or a random access failure, for example, if a high-speed wireless device stays within a small cell coverage of the NUL carrier for a short period of time. The third one of the multiple power values (e.g., 3 dB threshold, −15 dB threshold, etc.) for high-speed wireless devices may have larger value than the fourth one of the multiple power values (e.g., 2 dB threshold, −16.5 dB threshold, etc.) for non-high-speed wireless devices. A high-speed wireless device may select the SUL carrier, for example, if a received power (e.g., a measured downlink quality) of the high-speed wireless device is 2.5 dB (because 2.5 dB is smaller than the 3 dB threshold) or −16 dB (because −16 dB is smaller than the −15 dB threshold). A non-high-speed wireless device may select the NUL carrier, for example, if a received power of the non-high-speed wireless device is 2.5 dB (because 2.5 dB is larger than 2 dB) or −16 dB (because −16 dB is larger than −16.5 dB threshold).

The first message 1751 may comprise a first PRACH frequency offset for a random access preamble transmission via the first uplink (e.g., NUL) carrier and a second PRACH frequency offset for a random access preamble transmission via the second uplink (e.g., SUL) carrier. At step 1852, the BS1 1711 may send, to the BS2 1712, a second message 1752, for example, after or in response to the first message 1751. The BS1 1711 may send the second message 1752 via the direct interface (e.g., Xn interface, X2 interface, and/or the like) between the BS1 1711 and the BS2 1712. The second message 1752 may comprise at least one of an Xn setup response message, an NG-RAN node configuration update acknowledge message, an NG-RAN node configuration update failure message, an X2 setup response message, an eNB configuration update acknowledge message, an eNB configuration update failure message, and/or the like. The second message 1752 may indicate the reception of the first message 1751.

The BS1 1711 may determine one or more radio resource configuration parameters of a second cell (Cell2) of the BS1 1711 for one or more wireless devices, for example, based on the first message 1751. The one or more radio resource configuration parameters may be for uplink, sidelink, and/or downlink. The one or more radio resource configuration parameters may comprise at least one of: at least one beam configuration parameters; at least one bandwidth part (BWP) configuration parameters; at least one transmission power configuration parameter; at least one frequency configuration parameter; at least one beamforming configuration parameter; at least one physical control channel scheduling parameter; at least one antenna configuration parameter; at least one cell selection or reselection configuration parameter for one or more wireless devices; at least one system information; at least one interference control parameter; one or more MBSFN configuration parameters, UL/SUL configuration parameters, and/or the like.

The UL/SUL configuration parameters of the BS1 1711 may comprise a third PRACH frequency offset for a random access preamble transmission via a NUL carrier of the Cell2 of the BS1 1711 and a fourth PRACH frequency offset for a random access preamble transmission via an SUL carrier of the Cell2 of the BS1 1711. The BS1 1711 may determine the third PRACH frequency offset and/or the fourth PRACH frequency offset based on the first PRACH frequency offset (for the NUL carrier of the Cell1) and/or the second PRACH frequency offset (for the SUL carrier of the Cell1) received via the first message 1751 from the BS2 1712. The BS1 1711 may configure the third PRACH frequency offset and/or the fourth PRACH frequency offset to be different from the first PRACH frequency offset and/or the second PRACH frequency offset, so that random access preambles transmitted to the BS1 1711 may not interfere with the reception of random access preambles transmitted to the BS2 1712.

The BS1 1711 may configure frequencies and/or bandwidths of an NUL carrier and/or an SUL carrier of the Cell2 to be different from frequencies and/or bandwidths of the NUL carrier and/or the SUL carrier of the Cell1 of the BS2 1712. The BS1 1711 may configure frequencies and/or bandwidths of an NUL carrier and/or an SUL carrier of the Cell2 to be different from frequencies and/or bandwidths of the NUL carrier and/or the SUL carrier of the Cell1 of the BS2 1712, so that frequencies and/or bandwidths of the NUL carrier and/or the SUL carrier of the Cell2 and frequencies and/or bandwidths of the NUL carrier and/or the SUL carrier of the Cell1 does not interfere with each other.

The at least one beam configuration parameters may be for one or more wireless devices. The at least one beam configuration parameters may comprise one or more parameters indicating at least one of: a plurality of beam indexes of a plurality of beams; a plurality of SSB beam configurations; a plurality of CSI-RS beam configurations; a plurality of beam directions of a plurality of beams; a subcarrier spacing for a plurality of beams; a cyclic prefix; a number of contiguous PRBs; an index in the set of one or more DL beams and/or one or more UL beams; a link between a DL beam and an UL beam from a set of configured DL beams and UL beams; a DCI detection to a PDSCH reception timing value; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth; and/or the like.

The at least one beam configuration parameters may comprise one or more parameters indicating at least one of: CSI-RS beam indexes, SS beam indexes, BRACH resource configurations, BRACH preamble configuration parameters, beam based SRS transmission configuration information, beam based CSI-RS configuration parameters, beam based SS configuration parameters, beam failure recovery timer, number of random access preamble transmission repetitions, beam measurement configuration parameters, beam failure detection RS resource configuration information (e.g., Beam-Failure-Detection-RS-ResourceConfig), candidate beam RS list (e.g., Candidate-Beam-RS-List) for radio link quality measurements on a serving cell, beam failure candidate beam received power threshold (e.g., Beam-failure-candidate-beam-threshold), control resource set (CORE-SET) information for beam failure recovery response (e.g., Beam-failure-Recovery-Response-CORESET), RACH resource for beam failure recovery procedure (e.g. Beam-failure-recovery-request-RACH-Resource), time window information for beam failure recovery request (e.g., Beam-failure-recovery-request-window), TCI-StatesPDCCH, and/or the like.

A first base station (e.g., the BS1 1711) may reconfigure uplink/downlink transmission power for the first beam for one or more wireless devices, for example, if the one or more wireless devices experience a failure during a time that a first beam of a plurality of beams of a cell is used. A first base station (e.g., the BS1 1711) may instruct one or more wireless devices to use a second beam of a plurality of beams of a cell, for example, if a channel quality (e.g. RSRP, RSRQ) of the second beam is good when a wireless device experiences a failure during a time that a first beam is used and when measurement results of the one or more wireless device are similar to measurement results of the wireless device at the failure.

The at least one BWP configuration parameters may be for one or more wireless devices. The at least one BWP configuration parameters may comprise one or more parameters indicating at least one of: a plurality of BWP indexes of a plurality of BWPs; a plurality of BWP bandwidths of a plurality of BWPs; a default BWP index of a default BWP of the plurality of BWPs; a BWP inactivity timer; an initial BWP index of an initial BWP (e.g., an initial active BWP) of a plurality of BWPs; a subcarrier spacing for a plurality of BWPs; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing value; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth; and/or the like.

A first base station may not configure a first BWP of a plurality of BWPs of a cell as a default BWP (and/or as an initial BWP) for one or more wireless devices, for example, if the one or more wireless devices experiences a failure during a time in which the first BWP is an active BWP. A first base station may configure a second BWP of a plurality of BWPs of a cell as a default BWP (and/or as an initial BWP) for one or more wireless devices, for example, if a channel quality (e.g. RSRP, RSRQ) of the second BWP is good (e.g., better than a channel quality of an active BWP) when the one or more wireless devices experience a failure during a time in which a first BWP of the plurality of BWPs is an active BWP.

The at least one transmission power configuration parameter may comprise a maximum downlink/uplink cell transmission power, a physical downlink control channel (PDCCH) transmission power, one or more power control parameters for uplink and/or downlink, a TPC configuration parameter, an SRS configuration parameter, and/or the like for one or more wireless devices and/or for the first base station. The first base station may increase a transmission power of a PDCCH, for example, if the first base station determines that a failure occurred because of a low transmission power of the PDCCH (e.g., based on measurement results of the wireless device information). The first base station may reschedule a PDCCH to be located at other subframes, for example, if a failure occurred because of large interferences on the PDCCH.

A first base station may increase an uplink/downlink power level (e.g., 0.1 dB increase) for one or more wireless devices (e.g., wireless devices served in the first cell, such as the Cell1), for example, if the one or more wireless devices experience a failure during a time in which a first beam is used. A first base station may not configure a first beam for a random access preamble transmission of one or more wireless devices, for example, if a cause of a failure of the one or more wireless devices is a random access problem and the one or more wireless devices experience the failure during a time in which the first beam is used. A first base station may increase an uplink power level for one or more wireless devices, for example, if a cause of a failure of the one or more wireless devices is an RLC maximum number of retransmissions (e.g., an uplink transmission problem; a number of RLC retransmissions satisfies a threshold value) and the one or more wireless devices experience a failure during a time in which a first beam is used.

The at least one frequency configuration parameter may comprise a carrier frequency, a bandwidth, one or more bandwidth part configuration parameters, and/or the like. The first base station may change an operation frequency to other frequency, for example, if a cell of the first base station experiences large interferences from one or more neighboring cells. The first base station may instruct one or more wireless devices to use a beam other than a particular beam of a served cell of the first base station, for example, if the particular beam experiences large interferences from one or more neighboring cells or one or more wireless signals of other technologies and if measurement results of the one or more wireless devices are similar to measurement results of a wireless device at a failure.

The at least one beamforming configuration parameter may comprise one or more beamforming direction configuration parameters, one or more beam sweeping configuration parameters, one or more synchronization signal (SS)/reference signal (e.g., CSI-RS) configuration parameters, one or more beam recovery related parameters, one or more BRACH parameter, one or more preamble configuration parameters for beam recovery, one or more random access configuration parameters of one or more beams, and/or the like. The first base station may reschedule random access resources and/or BRACH resources, and/or may reconfigure preambles to reduce random access contentions, for example, if the failure occurred because of a random access failure or a failure of a beam recovery procedure (e.g., out-of-sync).

The at least one physical control channel scheduling parameter may comprise a subframe pattern configuration parameter, a measurement subframe pattern configuration parameter, a transmission type parameter indicating a localized transmission and/or distributed transmission, a resource block assignment configuration parameter, a CSI-RS configuration parameter, and/or the like. The at least one antenna configuration parameter may comprise default antenna configuration parameters, an antenna port configuration parameter, a number of CRS antenna port parameter, and/or the like. The at least one cell selection or reselection configuration parameter for one or more wireless devices may comprise one or more power/time threshold parameters for cell selection/reselection of at least one wireless device of the base station, one or more cell priority configuration parameters for cell selection/reselection, and/or the like. A failure occurred because of a random access failure of the wireless device, the first base station may increase values of the one or more power/time threshold parameters so that wireless devices may avoid the failed cell, for example, if the wireless devices do not satisfy increased thresholds.

The first base station may reconfigure one or more configurations (e.g., IEs of the at least one system information) comprising at least one of system information type block type 1 to 21 based on wireless device information. The at least one interference control parameter may comprise one or more (e.g., almost blank) subframe configuration parameters, one or more CoMP interference management related parameters, and/or the like. The first base station may schedule resource blocks for a neighboring cell and a failed cell not to use the resource blocks simultaneously, for example, if a failure occurred because of interferences from the neighboring cell of the failed cell.

The first base station may transmit at least one system information blocks comprising the one or more radio resource configuration parameters. The at least one system information blocks may be at least one of the system information block type 1 to 21. The first base station may send (e.g., transmit) at least one of the at least one cell configuration parameter to one or more wireless devices (e.g., via MAC CE, DCI, and/or an RRC message).

The second message 1752 may comprise one or more elements of the one or more radio resource configuration parameters of the Cell2, which may be configured based on the first message 1751. The one or more wireless devices may perform one or more measurements (e.g., an RSRP measurement 1753). The one or measurements may comprise a measurement of a DL signal from the BS2 1712. The DL signal may comprise one or more of a synchronization signal, a CSI-RS, etc.

At step 1854, the first base station may receive, from the first wireless device, measurement results (e.g., a measurement report 1754) comprising RSRP and/or RSRQ (e.g., measured downlink quality) of the first cell (e.g., the Cell1) of the second base station (e.g., the BS2 1712) and/or one or more cells of the first base station. The measurement results may comprise a cell identifier of the first cell and/or one or more cell identifiers of the one or more cells of the first base station (e.g., cell identifiers of three cells of the first base station). At step 1855, the first base station (e.g., the BS1 1711) may make a handover decision 1755 for a first wireless device (e.g., the wireless device 1720) based on the first message 1751 and/or the measurement results (e.g., the measurement results (e.g., the measurement report 1754).

The first base station may decide (e.g., multi-connectivity decision) to use radio resources of the second base station for a third wireless device based on the first message (e.g., the first message 1751) (e.g., decide to initiate/modify a multi-connectivity with the second base station based on the first message 1751). The first base station may receive, from the third wireless device, measurement results comprising RSRP and/or RSRQ (e.g., measured downlink quality) of the first cell of the second base station and/or one or more cells of the first base station. The measurement results may comprise a cell identifier of the first cell and/or one or more cell identifiers of the one or more cells of the first base station.

The handover decision 1755 (or multi-connectivity decision) may be based on the measurement results and/or the first power value (e.g., an RSRP threshold, a power threshold, a first threshold, a broadcast threshold) for a selection of one of the first uplink carrier and the second uplink carrier of the first cell. The first base station may not initiate a handover towards the first cell for a first wireless device, for example, if a measured downlink quality by the first wireless device for the first cell is larger than the first power value because if the first wireless device is a high-speed wireless device and/or a reliable service requiring wireless device (e.g., URLLC UE), the first wireless device may be better to avoid using the NUL carrier. The first base station may not initiate a handover towards the first cell for the first wireless device, for example, if the first base station receives, from the second base station, information that the SUL carrier of the first cell is in a high traffic load state and if a measured downlink quality of the first wireless device for the first cell is smaller than the first power value because the first wireless device may use the SUL carrier (which is in a high traffic load state) of the first cell after a handover completion.

At step 1856, the first base station may send, to the second base station, a handover request message (e.g., a handover request 1756) (or a secondary base station addition/modification request) for the first wireless device, for example, after or in response to the handover decision (or multi-connectivity decision). The handover request message (or secondary base station addition/modification request) may comprise a cell identifier of the first cell; the measurement results received from the wireless device; one or more bearer (e.g., QoS flow, PDU session) configuration information comprising QoS information (QCI, ARP), PDU session identifier, QoS flow identifier, slice identifier (NSSAI, S-NSSAI, slice instance identifier), and/or the like; AMBR (allowed aggregated maximum bit rate per UE or per PDU session); a handover restriction list of the wireless device; a wireless device identifier of the wireless device; security information; one or more RRC configuration parameters; and/or the like.

At step 1857, the first base station may receive, from the second base station, a handover response message (e.g., a handover response 1757 or a secondary base station addition/modification response) indicating acceptance of the handover request for the wireless device, for example, after or in response to the handover request message (or secondary base station addition/modification request) for the first wireless device. The handover response message may comprise at least one of allowed bearer list (QoS flow, PDU session), one or more radio resource configuration parameters for the wireless device, one or more RRC configuration parameters, random access resource information (e.g., preamble information, RACH resource information) for a random access at the first cell for a handover (or cell addition) of the wireless device, and/or the like. The RACH resource information may indicate resources of the first uplink (e.g., NUL) and/or the second uplink (e.g., SUL).

At step 1858, the first base station may send (e.g., transmit), to the first wireless device, a handover command message (e.g., a handover command 1758 comprising an RRC connection reconfiguration message) (or RRC reconfiguration message), for example, after or in response to receiving the handover response message (or secondary base station addition/modification response). The handover command message (or the RRC reconfiguration message) may comprise one or more elements of the handover response message (or the secondary base station addition/modification response) (e.g., the one or more RRC configuration parameters, the one or more radio resource configuration parameters, the allowed bearer list, the random access resource information, etc.).

The first base station may determine a handover target uplink (or a secondary base station addition/modification target uplink) of a target cell for the first wireless device, for example, based on the measurement results received from the first wireless device and/or based on the first power value for a selection of the first uplink or the second uplink carriers of the second base station. The handover target uplink carrier may be one of the first uplink carrier or the second uplink carrier of the first cell. The handover target uplink carrier may be an uplink carrier used for a random access procedure (e.g., a random access 1759) comprising a transmission of the random access preamble for a handover towards the first cell. At step 1859, the first wireless device may perform the random access procedure with the second base station.

The first base station may send (e.g., transmit), to a second wireless device, measurement configuration parameters determined based on the first message. The measurement configuration parameters may comprise a measurement threshold configured based on (e.g., same to) the first power value for the first cell. A wireless device may send (e.g., transmit) a measurement result to the first base station, for example, if a measured downlink quality of the first cell is equal to or larger than the measurement threshold (e.g., the first power value). The first uplink (e.g., NUL) carrier may support a high speed uplink transmission and the first base station may make a handover decision for a wireless device, for example, if the wireless device requires a high speed uplink transmission and the first power value is satisfied (e.g., a measured downlink quality of the first cell is equal to or larger than the measurement threshold) based on a measurement result. The first uplink (e.g., NUL) carrier may support a high speed uplink transmission and the first base station may make a handover decision for the wireless device, for example, if the wireless device requires a high speed uplink transmission, the second uplink is in a high traffic load state, and the first power value is satisfied (e.g., a measured downlink quality of the first cell is equal to or larger than the measurement threshold) based on a measurement result.

The first base station may receive, from the second base station, a message comprising radio resource status information of the first uplink (e.g., NUL) carrier and/or the second uplink (e.g., SUL) carrier of the first cell. The radio resource status information may indicate at least one of a first physical resource block (PRB) usage information (for non GBR and GBR packets) of the second uplink, a second PRB usage information for GBR packets of the second uplink, a third PRB usage information for non GBR packets of the second uplink, a fourth physical resource block (PRB) usage information (for non GBR and GBR packets) of the first uplink, a fifth PRB usage information for GBR packets of the first uplink, a sixth PRB usage information for non GBR packets of the first uplink, and/or the like. The first base station may make a handover decision (or a secondary base station addition/modification decision) for a second wireless device based on the radio resource status information. The first base station may send, to the second base station, a handover request message (or a secondary base station addition/modification request) for the second wireless device, for example, after or in response to the handover decision. The first base station may not initiate a handover towards the first cell for the first wireless device, for example, if the first base station receives, from the second base station, information that the second uplink (e.g., SUL) carrier of the first cell is in a high traffic load state and if a measured downlink quality of the first wireless device for the first cell is smaller than the first power value because the first wireless device may use the second uplink (e.g., SUL) carrier (which is in a high traffic load state) of the first cell after a handover completion.

The first base station may receive, from a second base station, a first message comprising uplink configuration parameters for a first cell of the second base station. The uplink configuration parameters may indicate at least one of a first frequency/bandwidth of a first uplink carrier (e.g., an NUL carrier), a second frequency/bandwidth of a second uplink carrier (e.g., an SUL carrier), and/or a first power value. A wireless device may select the second uplink carrier for an initial access to the first cell, for example, if a measured downlink quality of the first cell is lower than the first power value. The first base station may send, to the second base station, a second message indicating the reception of the first message. The first base station may make a handover decision for the wireless device based on the first message. The first base station may send, to the second base station, a handover request message for the wireless device, for example, after or in response to the handover decision. The handover decision may be based on the uplink configuration parameters.

The first base station may send (e.g., transmit), to the wireless device, one or more measurement configuration parameters determined based on the first message. The first message may comprise one or more parameters for the first cell. The one or more parameters may indicate at least one of a cell identifier of the first cell, a frequency of a downlink carrier, and/or the like. The first message may comprise at least one of a first PRACH frequency offset for a random access preamble transmission via the first uplink carrier, and/or a second PRACH frequency offset for a random access preamble transmission via the second uplink carrier.

The first base station may receive, from the second base station, a message comprising radio resource status information of the first uplink carrier and the second uplink carrier. The radio resource status information may indicate at least one of first physical resource block (PRB) usage information, second PRB usage information for GBR packets, and/or third PRB usage information for non GBR packets. The first base station may make a handover decision for a second wireless device based on the radio resource status information. The first base station may send, to the second base station, a handover request message for the second wireless device, for example, after or in response to the handover decision. The first power value may comprise at least one of a second threshold for a high-speed wireless device and/or a third threshold for a non-high-speed wireless device.

Figure 19:
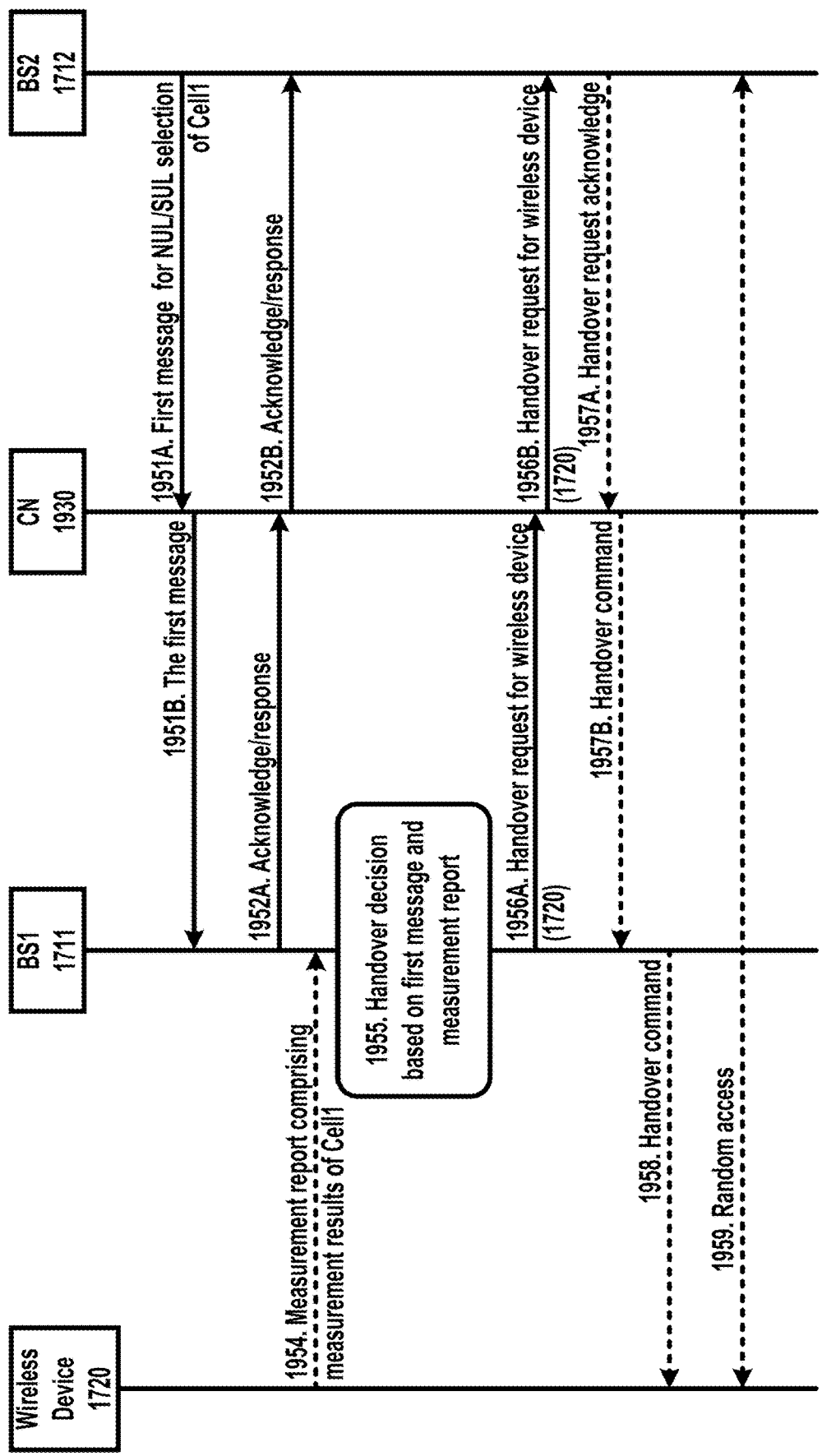
FIG. 19 shows an example of a handover procedure.

FIG. 19 shows an example of a handover procedure. FIG. 19 may be similar to FIG. 18 except that, for example, the communications between the BS1 1711 and the BS2 1712 may be performed indirectly via a core network (CN) 1930. The CN 1930 may comprise an AMF and/or MME. Communications to and from devices in FIG. 19 may comprise any of the communications described above regarding FIGS. 16-18. At step 1951A, the core network 1930 may receive, from the BS2 1712 which may send, a first message for NUL/SUL selection of a cell (e.g., cell1). At step 1951B, the core network 1930 may send, to the BS1 1711, the first message. At step 1952A, the core network 1930 may receive, from the BS1 1711 which may send, an acknowledgement and/or response. At step 1952B, the core network 1930 may send, to the BS2 1712, the acknowledgement and/or response. At step 1956A, the core network 1930 may receive, from the BS1 1711 which may send, a handover request for the wireless device 1720. At step 1956B, the core network 1930 may send, to the BS2 1712 which may receive, the handover request for the wireless device 1720. At step 1957A, the core network 1930 may receive, from the BS2 1712 which may send, a handover request acknowledge. At step 1957B, the core network 1930 may send, to the BS1 1711 which may receive, a handover command.

Figure 20:
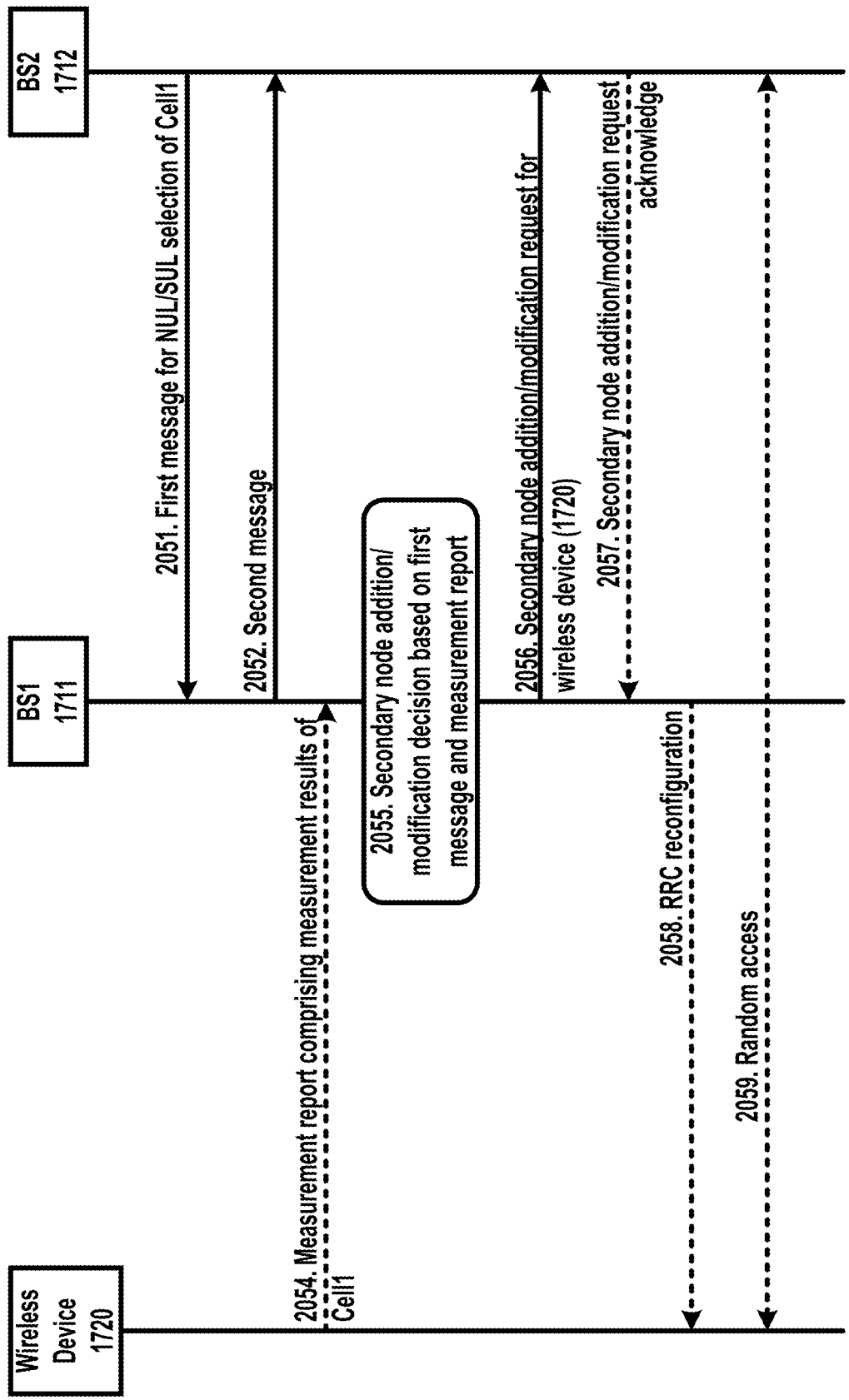
FIG. 20 shows an example of a secondary node addition/modification procedure (e.g., for dual connectivity).

FIG. 20 shows an example of a secondary node addition/modification procedure (e.g., for dual connectivity). Communications to and from devices in FIG. 20 may comprise any of the communications described above regarding FIGS. 16-19. At step 2051, a second base station (e.g., the BS2 1712) may send a first message to a first base station (e.g., the BS1 1711). The first message may be similar to the first message 1751. The first message may comprise a parameter (e.g., the first power value, a threshold, etc.) for a selection between an NUL carrier and an SUL carrier of a first cell (e.g., the Cell1 of the BS2 1712). At step 2052, the first base station may send, to the second base station, a second message, for example, after or in response to receiving the first message. The second message may be similar to the message 1752. A wireless device (e.g., the wireless device 1720) may measure (e.g., an RSRP measurement 1753) a downlink signal of the first cell of the second base station. At step 2054, the wireless device may send, to the first base station, a measurement report comprising measurement results of the first cell. The measurement report may be similar to the measurement report 1754. At step 2055, the first base station may make a secondary node addition/modification decision, for example, based on the first message and the measurement report. The secondary node addition/modification decision may comprise causing the wireless device to establish a connection with the second base station by establishing a connection with the first cell (e.g., connections with DL carrier and at least one UL carrier of the first cell). The secondary node addition/modification decision may cause the wireless device to have dual connectivity with the second cell of the first base station and the first cell of the second base station. At step 2056, the first base station may send, to the second base station, a secondary node addition/modification request for the wireless device. The second base station may serve as the secondary node for the wireless device. At step 2057, the second base station may send, to the first base station, a secondary node addition/modification request acknowledgement. At step 2058, the first base station may send, to the wireless device, an RRC reconfiguration message. The RRC reconfiguration message may comprise information for the secondary node addition/modification. At step 2059, the wireless device may communicate with the secondary base station (e.g., by performing a random access) to add or modify the second base station as a secondary node.

Figure 21:
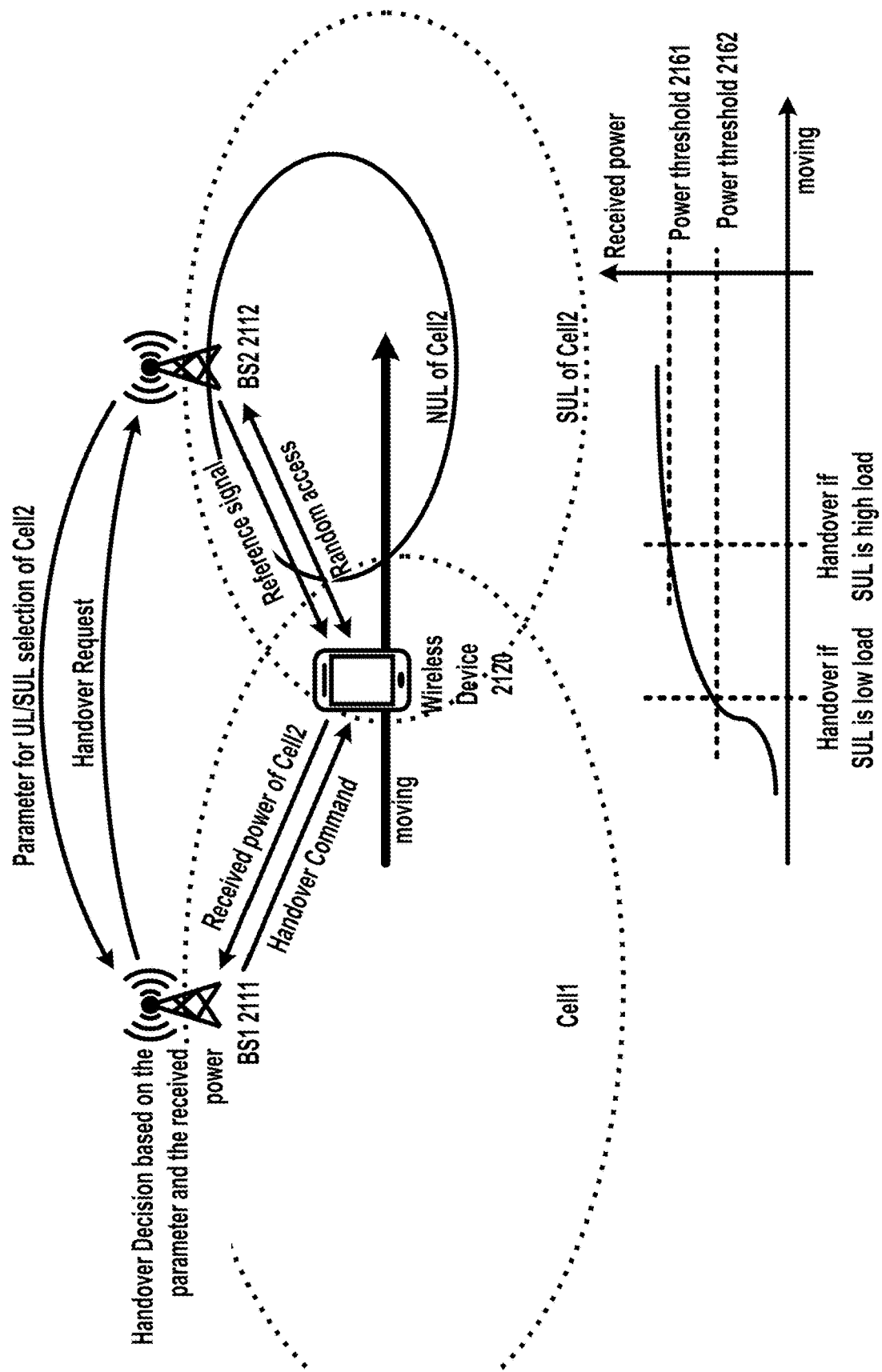
FIG. 21 shows an example of a handover procedure.

FIG. 21 shows an example of a handover procedure. A first base station (e.g., a BS1 2111) may configure a wireless device (e.g., a wireless device 2120) with one or more RRC configurations. The wireless device may be RRC connected with the first base station via a first cell (e.g., a Cell1) of the first base station. The wireless device may be moving from the first base station to a second base station (e.g., a BS2 2112). The first base station may receive, from the second base station, one or more parameters for a selection between an NUL carrier and an SUL carrier of a second cell (e.g., a Cell2) of the second base station. The one or more parameters may comprise one or more power values (e.g., a threshold, a power threshold, an RSRP threshold, a broadcasted threshold, etc.) associated with the second cell. The one or more parameters may comprise one or more load status values (e.g., a value indicating a load status of the SUL carrier of the second cell, a value indicating a load status of the NUL carrier of the second cell, etc.). The first base station may instruct the wireless device to measure a downlink signal of the second cell. The wireless device may measure a signal quality (e.g., RSRP, RSRQ, etc.) of a reference signal (e.g., a CSI-RS, a synchronization signal, etc.) of the second cell. The wireless device may send, to the first base station, a measurement report. The measurement report may comprise the measured signal quality, such as RSRP of the reference signal, of the second cell, sent from the second base station. The first base station may make a handover decision, for example, based on the one or more parameters and the received measurement report. The first base station may send, to the second base station (directly or via a core network), a handover request (or a second node addition/modification request). The second base station may send, to the first base station (directly or via a core network), a handover request response (or a second node addition/modification response). The first base station may send, to the wireless device, a handover command (or a second node addition/modification command) so that the wireless device may handover to (or add/modify) the second cell. The handover command may indicate which carrier of the second cell may be used for the handover (or for the second node addition/modification).

The one or more parameters may comprise a power threshold 2161 (e.g., a threshold indicating a coverage boundary the NUL carrier of the Cell2). A comparison between the power threshold 2161 and a measured signal power (e.g., RSRP) of the downlink reference signal of the second cell may indicate whether the wireless device is within or outside of the coverage of the NUL carrier of the second cell. The wireless device may be within the coverage of the NUL carrier of the Cell2, for example, if the measured signal power is equal to or greater than the power threshold 2161. The wireless device may be outside of the coverage of the NUL of Cell2 (but within the coverage of the SUL of the Cell2), for example, if the measured signal power is less than the power threshold 2161 and if the measured signal power is equal to or greater than a power threshold 2162. The first base station may send, to the second base station and for the wireless device, a handover request (or the second node addition/modification request) requesting a handover (or the second node addition/modification) to Cell2, for example, if the measured signal power is less than the power threshold 2161 and if the measured signal power is equal to or greater than a power threshold 2162 if a traffic load of the SUL is low or medium. The first base station may send, to the second base station and for the wireless device, a handover request (or the second node addition/modification request) requesting a handover (or the second node addition/modification) to the Cell2. The handover request may comprise an indication of the SUL carrier of the Cell2 for the handover, for example, if the measured signal power is less than the power threshold 2161 and if the measured signal power is equal to or greater than a power threshold 2162. The second base station may or may not allow to use, for a handover, the SUL carrier of the Cell2 (e.g., based on a load of the SUL carrier of the Cell2). As shown in FIG. 21, the wireless device may be allowed to handover to the Cell2 by using the SUL carrier of the Cell2, for example, if the load of the SUL carrier of the Cell2 is low (e.g., the load of the SUL carrier is lower than a load threshold). The wireless device may not be allowed to use the SUL carrier of the Cell2 for the handover to the Cell2, for example, if the load of the SUL carrier of the Cell2 is high (but may be allowed to handover to the NUL carrier of the Cell2). The wireless device may wait until the measured signal power becomes equal to or greater than the power threshold 2161 to handover to the Cell2 by using the NUL carrier of the Cell2 (e.g., by sending a random access preamble via the NUL carrier of the Cell2). The first base station may not send, to the second base station, a handover request, for example, if the wireless device is within the SUL carrier coverage (but outside of the NUL carrier coverage) and if the load status of the SUL carrier of the Cell2 is high. The first base station may receive, from the second base station, the load status of the SUL carrier of the Cell2 and one or more of the power threshold 2161 or the power threshold 2162.

The first base station may send, to the second base station and for the wireless device, a handover request (or the second node addition/modification request) requesting a handover to the Cell2, for example, if the measured signal power is equal to or greater than the power threshold 2161 (e.g., if the SUL is in a high load status, the first base station may wait until the measured signal power becomes equal to or greater than the power threshold 2161 and may send the handover request). The first base station may send, to the second base station and for the wireless device, a handover request (or the second node addition/modification request) requesting a handover to the Cell2. The handover request may or may not comprise an indication of a selection of one or more of the NUL carrier and the SUL carrier of the Cell2, for example, if the measured signal power is equal to or greater than the power threshold 2161. The second base station may or may not allow a handover to the Cell 2. The target base station may not allow to use the SUL carrier of the Cell2, for example, based on a load of the SUL carrier of Cell2. The target base station may not allow to use the NUL carrier of the Cell2, for example, based on a load of the NUL carrier of Cell2. The handover request may be rejected, for example, if both the NUL carrier and the SUL carrier of the Cell2 are in high-load statuses. The second base station may not allow to use the SUL carrier of the Cell2, for example, if the wireless device is within the coverage of the NUL carrier of the Cell2 and the SUL carrier of the Cell2 is in a high-load status.

Figure 22:
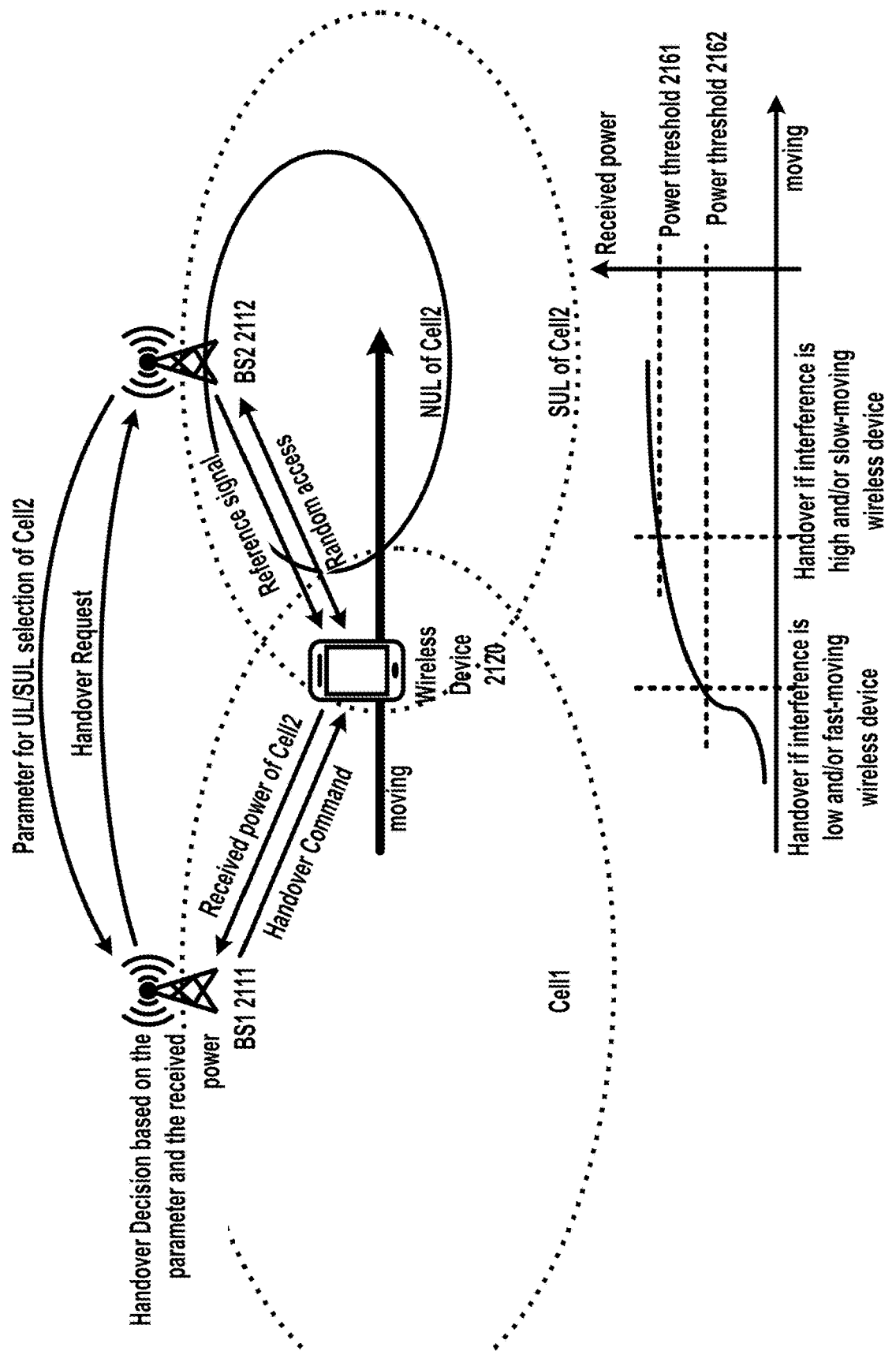
FIG. 22 shows an example of a handover procedure.

FIG. 22 shows an example of a handover procedure. The first base station may send, to the second base station and for the wireless device, a handover request (or the second node addition/modification request) requesting a handover to the Cell2, for example, based on an interference value (e.g., an interference threshold) and/or a measured signal quality (e.g., a quality threshold). The second base station may allow or reject a handover request based on the interference value. The second base station may send, to the first base station, the interference value. The interference value may indicate an interference status of the Cell2 of the second base station. The first base station may initiate a handover for the wireless device to the Cell2, for example, if the interference value (e.g., an average interference) is higher than an interference threshold and the wireless device is within the NUL coverage of the Cell2. The first base station may initiate a handover for the wireless device to the Cell2, for example, if the interference value (e.g., the average interference) is lower than or equal to the interference threshold and the wireless device is within the SUL coverage of the Cell2 (e.g., outside of the NUL coverage of the Cell2). The measured signal power, the power threshold 2161, and/or the power threshold 2162 may be used to determine whether the wireless device is within the SUL coverage and/or within the NUL coverage of the Cell2. The wireless device may measure a downlink signal of the Cell2 and may report the measurement result to the first base station (and the measurement result may be forwarded to the second base station). The measurement result may comprise the measure signal quality (e.g., SNR, average interference of the measured signal, etc.). The first base station and/or the second base station may determine, based on the measured signal quality, which uplink carrier to be used by the wireless device for a handover.

The one or more parameters may comprise a value indicating the movement speed of the wireless device (e.g., a speed threshold). The wireless device may be allowed to use, for a handover, the SUL carrier of the Cell2, for example, if the movement speed of the wireless device is equal to or greater than a speed threshold. For a fast-moving wireless device, the small coverage of the NUL carrier of the Cell2 may not be suitable. The decision to handover to the Cell2 may depend on a combination of a plurality of parameters (e.g., a power value, a load status value, an interference value, a movement speed value, etc.) described above. The SUL carrier of the Cell2 may be allowed for a handover to the Cell2 for a fast-moving wireless device even when a load status of the SUL carrier is high. The fast-moving wireless device may not stay within the coverage of the SUL carrier of the Cell2 for a long time, and the fast-moving wireless device may handover to another cell after a short period of time.

Figures 23A, 23B:
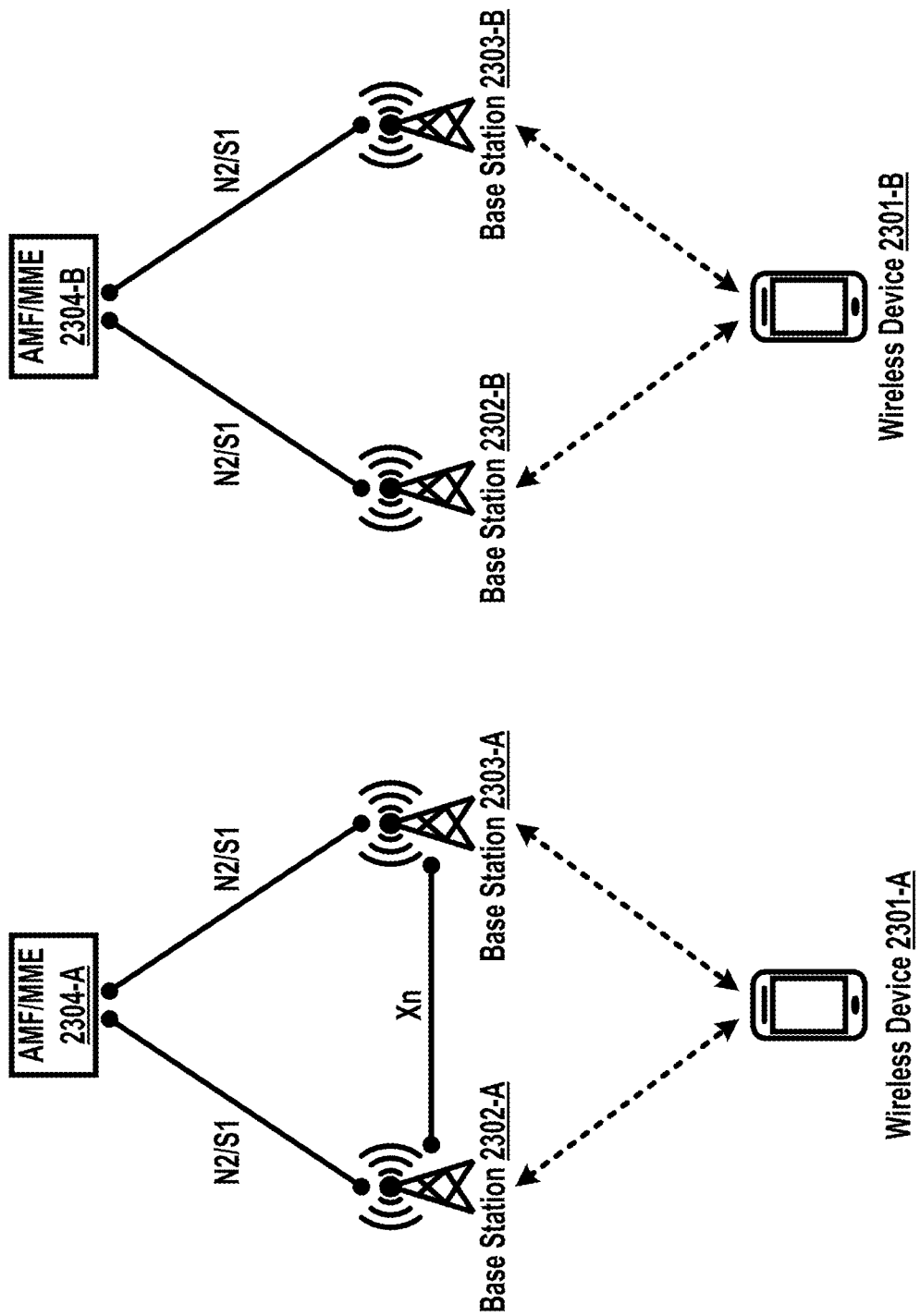
FIG. 23A and FIG. 23B show examples of communications between a wireless device and a base station.

FIG. 23A and FIG. 23B show examples of communications between a wireless device and a base station. Communications to and from devices in FIG. 23A and/or FIG. 23B may comprise any of the communications described above regarding FIGS. 16-22. In FIG. 23A, a wireless device 2301-A may communicate with a base station 2302-A (e.g., via a first uplink such as a normal uplink) and/or a base station 2303-A (e.g., via a second uplink such as a supplemental uplink). The base station 2302-A and the base station 2303-A may communicate with each other, for example, via an Xn interface. The base station 2302-A and/or the base station 2303-A may communicate with an AMF and/or MME 2304-A, for example, via N2/S1 interfaces. In FIG. 23B, a wireless device 2301-B may communicate with a base station 2302-B (e.g., via a first uplink such as a normal uplink) and/or a base station 2303-B (e.g., via a second uplink such as a supplemental uplink). The base station 2302-B and the base station 2303-B may not be configured to communicate with each other. The base station 2302-B and/or the base station 2303-B may communicate with an AMF and/or MME 2304-B, for example, via N2/S1 interfaces.

Figure 24:
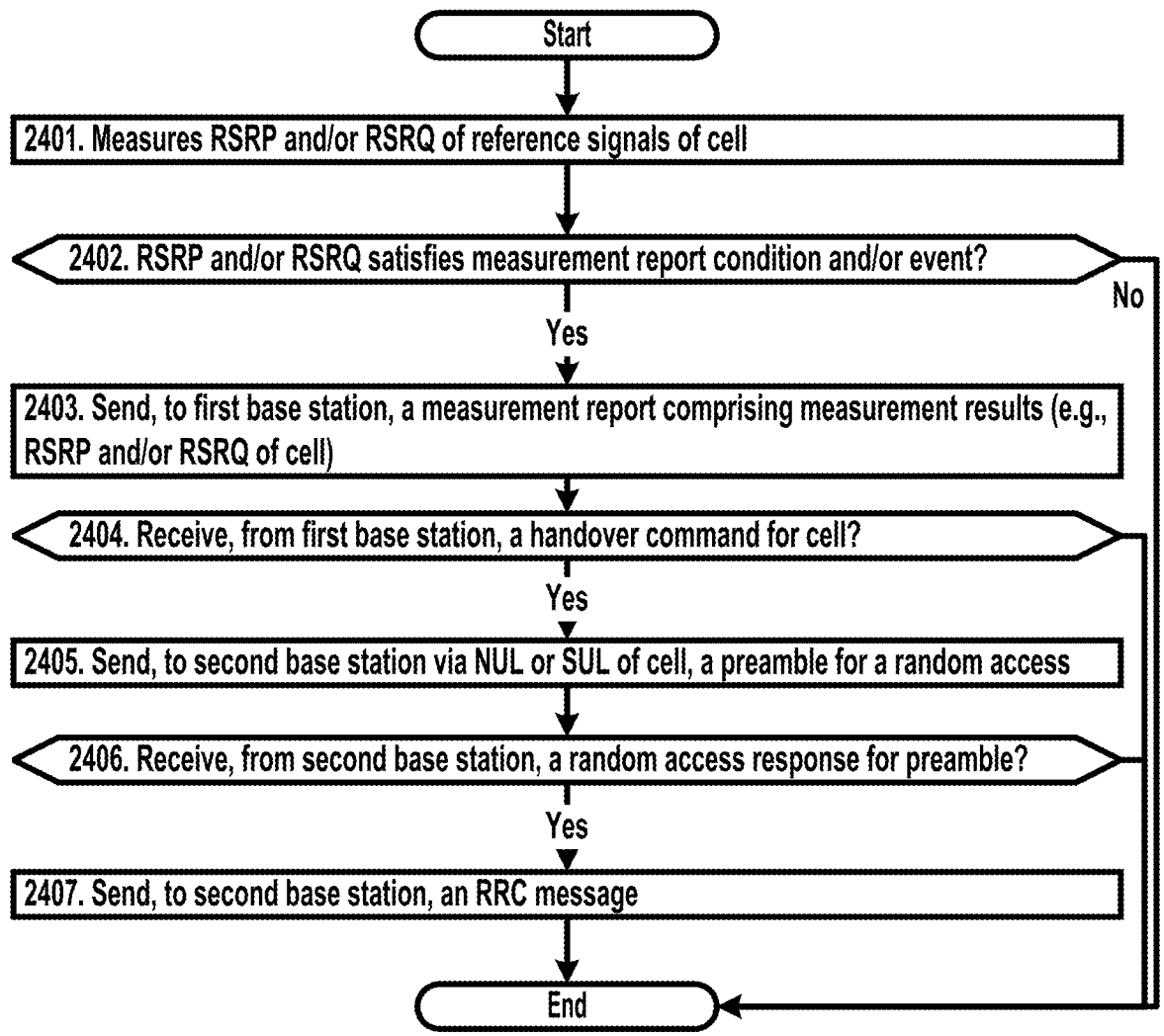
FIG. 24 shows an example method for a handover.

FIG. 24 shows an example method for a handover. At step 2401, a wireless device may measure reference signals (RSs) of a cell. The wireless device may measure, for example, RSRP and/or RSRQ of the RSs of the cell. At step 2402, the wireless device may determine whether the measurement of RSRP and/or RSRQ satisfies a measurement report condition and/or an event. If the wireless device determines that the measurement of RSRP and/or RSRQ satisfies a measurement report condition and/or an event, at step 2403, the wireless device may send, to a first base station (e.g., a serving base station), a measurement report comprising measurement results (e.g., RSRP and/or RSRQ of the cell).

At step 2404, the wireless device may receive, from the first base station, a handover command for the cell. The handover command may be based on a determination (e.g., by a serving base station) that the measurement results satisfy a threshold value for a handover (e.g., to a target base station). At step 2405, the wireless device may send, to a second base station (e.g., a target base station) via an NUL and/or an SUL or the cell, a preamble for a random access (e.g., to initiate a handover to the target base station). At step 2406, the wireless device may determine whether it has received, from the second base station (e.g., the target base station), a random access response for the preamble. If the wireless device has determined that it has received the random access response for the preamble, at step 2407, the wireless device may send, to the second base station (e.g., the target base station) an RRC message (e.g., to complete a handover to the target base station).

Figure 25:
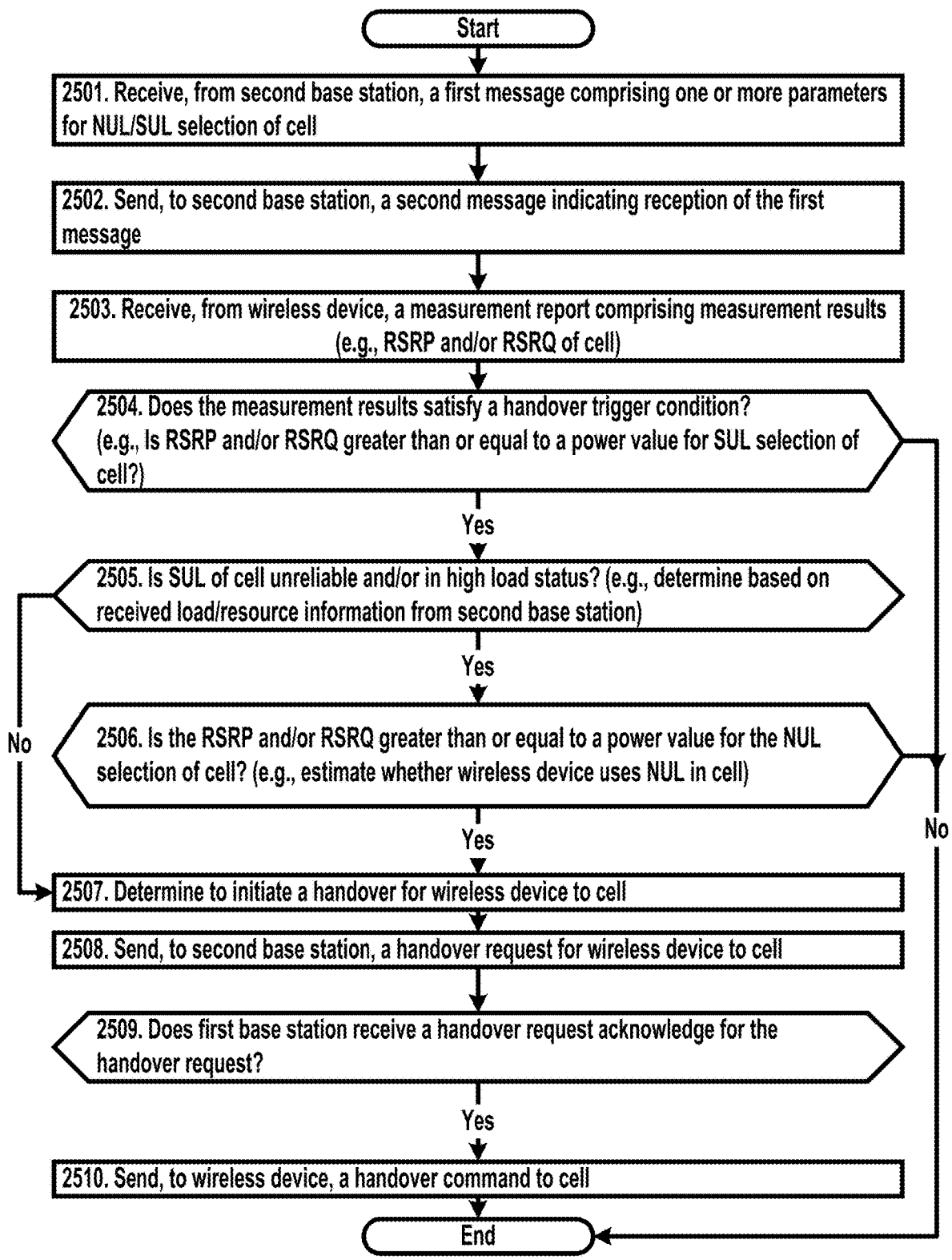
FIG. 25 shows an example method for a handover.

FIG. 25 shows an example method for a handover. At step 2501, a first base station (e.g., a serving base station, a source base station, etc.) may receive, from a second base station (e.g., a target base station), a first message. The first message may comprise one or more parameters (e.g., a first power value, etc.) for a normal uplink/supplemental uplink (NUL/SUL) selection of a cell. At step 2502, the first base station may send, to the second base station, a second message indicating a reception of the first message. At step 2503, the first base station may receive, from a wireless device, a measurement report. The measurement report may comprise measurement results from a measurement of RSs of a cell by the wireless device. The measurement results may comprise, for example, RSRP and/or RSRQ of the RSs of the cell. At step 2504, the first base station may determine whether the measurement results satisfy a handover trigger condition, such as whether RSRP and/or RSRQ is greater than or equal to a power value (e.g., the power threshold 2162) associated with the coverage of an SUL of the cell. If the first base station determines that the measurement results satisfy the handover trigger condition, at step 2505, the first base station may determine whether the SUL of the cell is unreliable and/or in a high load status. The first base station may determine whether the SUL of the cell is unreliable and/or in a high load status, for example, based on a received load and/or resource information from a second base station (e.g., a target base station). If the first base station determines that the SUL of the cell is unreliable and/or in a high load status, at step 2506, the first base station may determine whether the RSRP and/or RSRQ is greater than or equal to the first power value (e.g., the power threshold 2161) for the NUL selection of the cell. The first base station may determine whether the RSRP and/or RSRQ is greater than or equal to the first power value for the NUL selection of the cell, for example, based on an estimate of whether the wireless device uses an NUL in the cell. If the first base station determines that the SUL of the cell is not unreliable and/or not in a high load status (e.g., at step 2505), and/or if the first base station determines that the RSRP and/or RSRQ is greater than or equal to the power value for the NUL selection of the cell (e.g., at step 2506), at step 2507, the first base station may determine to initiate a handover for the wireless device to the cell (e.g., a handover by using the SUL if the SUL of the cell is not unreliable and/or not in a high load status; and a handover by using the NUL if the first base station determines that the RSRP and/or RSRQ is greater than or equal to the power value for the NUL selection of the cell). At step 2508, the first base station may send, to the second base station (e.g., a target base station), a handover request for the wireless device to the cell. At step 2509, the first base station may determine whether it has received a handover request acknowledge for the handover request. If the first base station determines that it has received a handover request acknowledge for the handover request, at step 2510, the first base station may send, to the wireless device, a handover command to the cell. The first base station and/or the wireless device may complete a handover of the wireless device from the first base station to the second base station.

Figure 26:
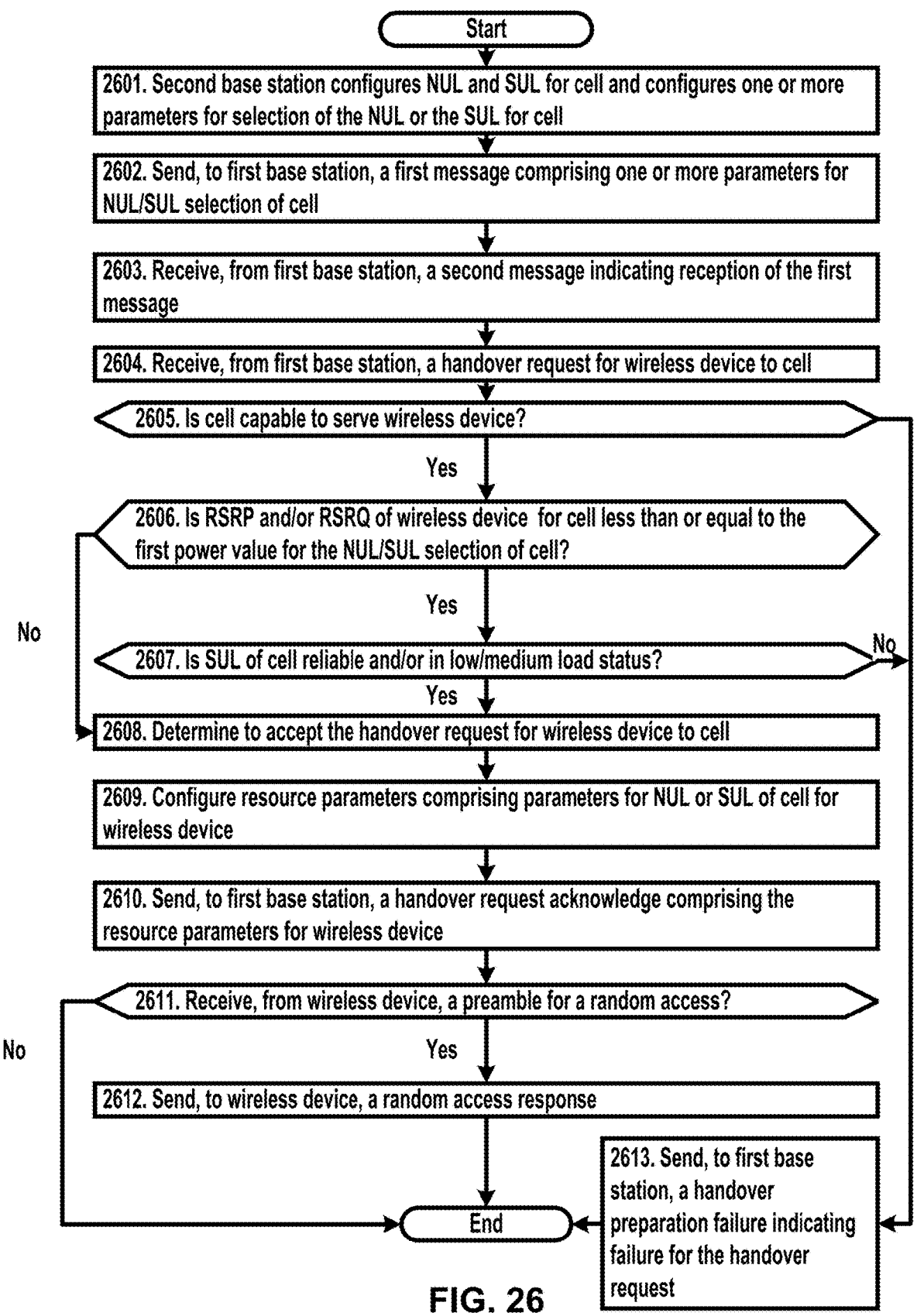
FIG. 26 shows an example method for a handover.

FIG. 26 shows an example method for a handover. At step 2601, a second base station (e.g., a target base station) may configure: an NUL and an SUL for a cell, and one or more parameters (e.g., a first power value) for a selection of the NUL or the SUL for the cell. At step 2602, the second base station may send, to a first base station (e.g., a serving base station), a first message. The first message may comprise the one or more parameters for a normal uplink/supplemental uplink (NUL/SUL) selection of the cell. At step 2603, the second base station may receive, from the first base station, a second message indicating a reception of the first message. At step 2604, the second base station may receive, from the first base station, a handover request for a wireless device to the cell. At step 2605, the second base station may determine whether the cell is capable to serve the wireless device. The second base station may determine whether the cell is capable to serve the wireless device, for example, based on one or more cell conditions and/or one or more parameters of the wireless device. If the second base station determines that the cell is not capable to serve the wireless device (e.g., at step 2605), at step 2613, the second base station may send, to the first base station, a handover preparation failure indicating a failure for the handover request. If the second base station determines that the cell is capable to serve the wireless device, at step 2606, the second base station may determine whether an RSRP and/or RSRQ of the wireless device for the cell is less than or equal to the first power value for the NUL/SUL selection of the cell. If the second base station determines that an RSRP and/or RSRQ of the wireless device for the cell is less than or equal to the first power value for the NUL/SUL selection of the cell, at step 2607, the second base station may determine whether an SUL of the cell is reliable and/or in a low and/or medium load status. The second base station may determine whether the SUL of the cell is reliable and/or in a low and/or medium load status, for example, based on a load measurement and/or resource information. If the second base station determines that the SUL of the cell is not reliable and/or is not in a low and/or medium load status (e.g., at step 2607), at step 2613, the second base station may send, to the first base station, a handover preparation failure indicating a failure for the handover request. If the second base station determines that the SUL of the cell is reliable and/or is in a low and/or medium load status (e.g., at step 2607), and/or if the second base station determines that RSRP and/or RSRQ of the wireless device for the cell is greater than the first power value for the NUL/SUL selection of the cell (e.g., at step 2606), at step 2608, the second base station may determine to accept the handover request for the wireless device to the cell a handover for the wireless device to the cell (e.g., a handover by using the SUL if the second base station determines that the SUL of the cell is reliable and/or is in a low and/or medium load status; and a handover by using the NUL if the second base station determines that RSRP and/or RSRQ of the wireless device for the cell is greater than the first power value). At step 2609, the second base station may configure resource parameters comprising parameters for an NUL or an SUL of the cell for the wireless device. At step 2610, the second base station may send, to the first base station, a handover request acknowledge. The handover request acknowledge may comprise the resource parameters for the wireless device. At step 2611, the second base station may determine whether it has received, from the wireless device, a preamble for a random access. If the second base station determines that it has received, from the wireless device, the preamble for a random access, at step 2612, the second base station may send, to the wireless device, a random access response. The second base station may complete a handover of the wireless device from the first base station.

A first base station may receive, from a second base station, one or more messages comprising uplink configuration parameters (e.g., for a cell of the second base station). The one or more message (e.g., the uplink configuration parameters) may comprise one or more parameters (e.g., a power value, a load status value, an interference value, etc.) for a selection (e.g., for a handover of the wireless device) of a first uplink of a cell of the second base station or a second uplink of the cell of the second base station. The first base station may send, to the second base station, a second message indicating the receiving of the one or more messages. The wireless device may select the second uplink for an initial access to the cell, for example, if a measured downlink signal quality of the cell is less than the power value. The first base station may receive, from a wireless device, a measurement report comprising an RSRP of the cell of the second base station. The measurement report may indicate the measured downlink signal quality. The first base station may determine a handover decision for the wireless device to the cell of the second base station. The first base station may send, to the wireless device, an indication of the first uplink or the second uplink. The handover decision may be based on the one or more parameters and the measurement report (e.g., the RSRP, the measured downlink signal quality, etc.). The first base station may send (e.g., transmit), to the second base station and based on the handover decision (e.g., to the first uplink or the second uplink), a handover message (e.g., a handover request message, handover command message, etc.) associated with the selection. The first base station may perform the handover decision based at least one of: first radio resource status information of the first uplink; or second radio resource status information of the second uplink. The one or more parameters may comprise at least one of: a power value (e.g., a power threshold) for a selection of the first uplink or the second uplink; a load status value (e.g., a load status threshold) associated with one or more of the first uplink or the second uplink; or an interference value (e.g., an interference threshold) for a selection of the first uplink or the second uplink. The one or more parameters may comprise at least one of: a power threshold for a high-speed wireless device; a power threshold for a non-high-speed wireless device; a power threshold for a wireless device for an ultra-reliable and low latency service; or a power threshold for a wireless device not requiring an ultra-reliable and low latency service. The one or more parameters may comprise a threshold value for one or more of a normal uplink of the cell or a supplemental uplink of the cell. The one or more messages comprise at least one of: first radio resource status information of the first uplink; or second radio resource status information of the second uplink. The first radio resource status information of the first uplink or second radio resource status information of the second uplink may comprise at least one of: physical resource block usage information; first physical resource block usage information for guaranteed bit rate packets; or second physical resource block usage information for non-guaranteed bit rate packets. The handover decision for the wireless device may be based on the first radio resource status information and/or the second radio resource status information. The one or more messages may comprise at least one of: first frequency information of the first uplink; second frequency information of the second uplink; first bandwidth information (e.g., frequency bandwidth) of the first uplink; second bandwidth information (e.g., frequency bandwidth) of the second uplink; information of one or more neighboring cells of the cell; a cell identifier of the cell; a base station identifier of the second base station; and/or a frequency of a downlink of the cell. The one or more messages may comprise at least one of: a first physical random access channel frequency offset for a random access preamble transmission via the first uplink; or a second physical random access channel frequency offset for a random access preamble transmission via the second uplink. The one or more messages may comprise at least one of: an Xn setup request message; an Xn setup response message; or a next generation radio access network node configuration update message. The power value may be used to determine whether to select, based on a received power from the cell, the first uplink or the second uplink. The first base station may compare the RSRP and a power value of the one or more parameters to determine whether to select the first uplink for access to the cell. One of the first uplink or the second uplink may be a normal uplink, and the other one of the first uplink or the second uplink may be a supplemental uplink. The wireless device may select the first uplink or the second uplink, for example, based on a received power of the cell being less than the power value. The normal uplink may use a higher frequency than the supplemental uplink. The first base station may send, to the wireless device, measurement configuration parameters, which may be determined based on the uplink configuration parameters. The cell may be configured with at least one of a TDD or an FDD. The first base station may receive the one or more messages via at least one of: an Xn interface established between the first base station and the second base station; an access and mobility management function; an N2 interface established between the first base station and the access and mobility management function; or an N2 interface established between the second base station and the access and mobility management function. The first base station may receive, from the second base station, a handover response message comprising radio resource control configuration parameters. The handover response message may be received, for example, after or in response to the handover request message. The first base station may send, to the wireless device, a handover command message comprising the radio resource control configuration parameters.

Figure 27:
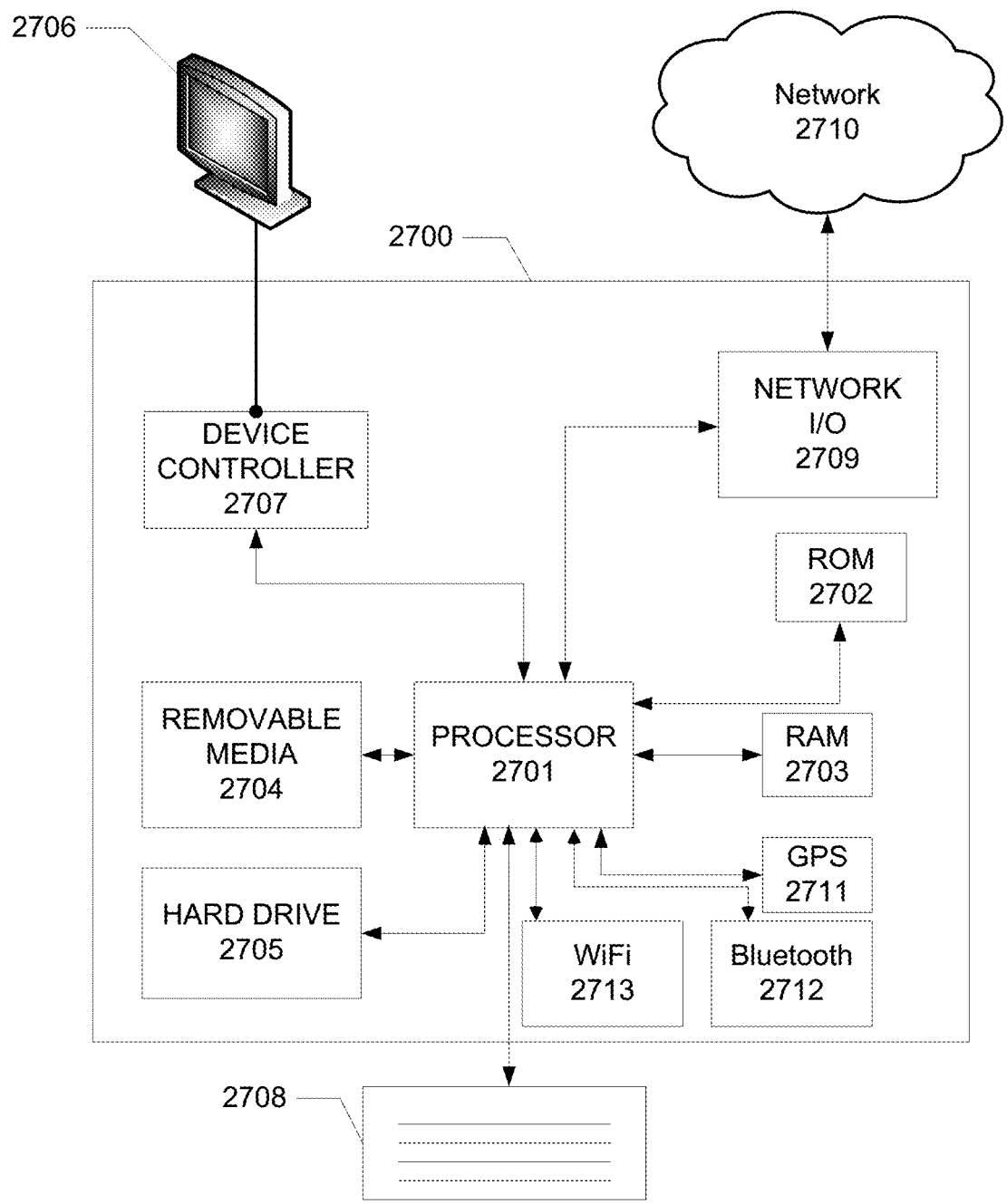
FIG. 27 shows example elements of a computing device that may be used to implement any of the various devices described herein.

FIG. 27 shows general hardware elements that may be used to implement any of the various computing devices discussed herein, including, e.g., the base station 120A and/or 120B, the wireless device 110 (e.g., 110A and/or 110B), or any other base station, wireless device, or computing device described herein. The computing device 2700 may include one or more processors 2701, which may execute instructions stored in the random access memory (RAM) 2703, the removable media 2704 (such as a Universal Serial Bus (USB) drive, compact disk (CD) or digital versatile disk (DVD), or floppy disk drive), or any other desired storage medium. Instructions may also be stored in an attached (or internal) hard drive 2705. The computing device 2700 may also include a security processor (not shown), which may execute instructions of one or more computer programs to monitor the processes executing on the processor 2701 and any process that requests access to any hardware and/or software components of the computing device 2700 (e.g., ROM 2702, RAM 2703, the removable media 2704, the hard drive 2705, the device controller 2707, a network interface 2709, a GPS 2711, a Bluetooth interface 2712, a WiFi interface 2713, etc.). The computing device 2700 may include one or more output devices, such as the display 2706 (e.g., a screen, a display device, a monitor, a television, etc.), and may include one or more output device controllers 2707, such as a video processor. There may also be one or more user input devices 2708, such as a remote control, keyboard, mouse, touch screen, microphone, etc. The computing device 2700 may also include one or more network interfaces, such as a network interface 2709, which may be a wired interface, a wireless interface, or a combination of the two. The network interface 2709 may provide an interface for the computing device 2700 to communicate with a network 2710 (e.g., a RAN, or any other network). The network interface 2709 may include a modem (e.g., a cable modem), and the external network 2710 may include communication links, an external network, an in-home network, a provider's wireless, coaxial, fiber, or hybrid fiber/coaxial distribution system (e.g., a DOCSIS network), or any other desired network. Additionally, the computing device 2700 may include a location-detecting device, such as a global positioning system (GPS) microprocessor 2711, which may be configured to receive and process global positioning signals and determine, with possible assistance from an external server and antenna, a geographic position of the computing device 2700.

The example in FIG. 27 may be a hardware configuration, although the components shown may be implemented as software as well. Modifications may be made to add, remove, combine, divide, etc. components of the computing device 2700 as desired. Additionally, the components may be implemented using basic computing devices and components, and the same components (e.g., processor 2701, ROM storage 2702, display 2706, etc.) may be used to implement any of the other computing devices and components described herein. For example, the various components described herein may be implemented using computing devices having components such as a processor executing computer-executable instructions stored on a computer-readable medium, as shown in FIG. 27. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features of the description may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the description, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the description. Accordingly, the foregoing description is by way of example only, and is not limiting.

What is claimed is:

1. A method comprising:
   receiving, by a first base station from a second base station, a first message comprising uplink configuration parameters for a cell, of the second base station, that comprises a plurality of uplinks;
   receiving, from a wireless device, a measurement report associated with at least one signal of the cell; and
   sending, based on the measurement report and a threshold value associated with uplink selection among the plurality of uplinks, a request to handover the wireless device to a selected uplink of the plurality of uplinks.

2. The method of claim 1, wherein the sending the request comprises at least one of:
   sending, to the wireless device, a first indication of the selected uplink for random access; or
   sending, to the second base station, a second indication of the selected uplink for random access,
   wherein the sending the request is further based on a load status value associated with one or more uplinks of the plurality of uplinks.

3. The method of claim 1, further comprising receiving, by the first base station from the second base station, at least one of:
   first radio resource status information of a first uplink of the plurality of uplinks; or
   second radio resource status information of a second uplink of the plurality of uplinks.

4. The method of claim 1, wherein the sending the request is further based on at least one of:
   first radio resource status information of a first uplink of the plurality of uplinks; or
   second radio resource status information of a second uplink of the plurality of uplinks.

5. The method of claim 1, wherein the selected uplink comprises a normal uplink carrier of the cell or a supplemental uplink carrier of the cell.

6. The method of claim 1, further comprising sending, to the wireless device and based on the first message, one or more measurement configuration parameters associated with the cell,
   wherein the first message comprises the threshold value.

7. The method of claim 1, wherein the first message comprises at least one of:
   a first physical random access channel frequency offset for a random access preamble transmission via a first uplink of the plurality of uplinks; or
   a second physical random access channel frequency offset for a random access preamble transmission via a second uplink of the plurality of uplinks.

8. The method of claim 1, further comprising:
   receiving, by the first base station from the second base station, radio resource status information of the plurality of uplinks, wherein the radio resource status information indicates:
   first physical resource block (PRB) usage information;
   second PRB usage information for guaranteed bit rate packets; and
   third PRB usage information for non-guaranteed bit rate packets, and
   wherein the sending the request is further based on the radio resource status information.

9. The method of claim 1, wherein the threshold value comprises at least one of:
   a power threshold for a high-speed wireless device;
   a power threshold for a non-high-speed wireless device;
   a power threshold for a wireless device for an ultra-reliable and low latency service; or
   a power threshold for a wireless device not requiring an ultra-reliable and low latency service.

10. The method of claim 1, wherein the uplink configuration parameters indicate:
    a first frequency bandwidth of a first uplink of the plurality of uplinks; and
    a second frequency bandwidth of a second uplink of the plurality of uplinks.

11. The method of claim 1, further comprising determining, based on the measurement report indicating a value greater than the threshold value, to send the request to handover the wireless device to the selected uplink of the plurality of uplinks.

12. The method of claim 1, further comprising:
    selecting, by the first base station and based on a latency service associated with the wireless device, an uplink, of the plurality of uplinks, as the selected uplink,
    wherein the threshold value is received from the second base station and indicates a threshold value associated with the latency service, and
    wherein the sending the request to handover comprises sending, by the first base station to the second base station, the request to handover.

13. The method of claim 1, further comprising:
    selecting, by the first base station and based on a moving speed of the wireless device, an uplink, of the plurality of uplinks, as the selected uplink, wherein the threshold value is received from the second base station and indicates a threshold value associated with the moving speed, and
wherein the sending the request to handover comprises sending, by the first base station to the second base station, the request to handover.

14. A method comprising:
sending, by a second base station to a first base station, a first message comprising uplink configuration parameters for a cell, of the second base station, that comprises a plurality of uplinks;
sending at least one reference signal via a downlink of the cell of the second base station;
receiving, by the second base station from the first base station, a request to handover a wireless device to a selected uplink of the plurality of uplinks, wherein the request is based on:
 a threshold value associated with uplink selection among the plurality of uplinks; and
 a measurement report associated with the at least one reference signal; and
receiving, by the second base station from the wireless device, an uplink signal via the selected uplink.

15. The method of claim 14, further comprising sending, for a handover of the wireless device, a response to the uplink signal,
wherein the handover of the wireless device is based on a load status value associated with one or more uplinks of the plurality of uplinks.

16. The method of claim 14, further comprising sending, by the second base station to the first base station, at least one of:
first radio resource status information of a first uplink of the plurality of uplinks; or
second radio resource status information of a second uplink of the plurality of uplinks.

17. The method of claim 14, wherein the selected uplink comprises a normal uplink carrier of the cell or a supplemental uplink carrier of the cell.

18. The method of claim 14, wherein the first message comprises at least one of:
a first physical random access channel frequency offset for a random access preamble transmission via a first uplink of the plurality of uplinks; or
a second physical random access channel frequency offset for a random access preamble transmission via a second uplink of the plurality of uplinks.

19. The method of claim 14, further comprising:
sending, by the second base station to the first base station, radio resource status information of the plurality of uplinks, wherein the radio resource status information indicates:
 first physical resource block (PRB) usage information;
 second PRB usage information for guaranteed bit rate packets; and
 third PRB usage information for non-guaranteed bit rate packets, and
wherein the request is further based on the radio resource status information.

20. The method of claim 14, wherein the threshold value comprises at least one of:
a power threshold for a high-speed wireless device;
a power threshold for a non-high-speed wireless device;
a power threshold for a wireless device for an ultra-reliable and low latency service; or
a power threshold for a wireless device not requiring an ultra-reliable and low latency service.

21. The method of claim 14, wherein the uplink configuration parameters indicate:
a first frequency bandwidth of a first uplink of the plurality of uplinks; and
a second frequency bandwidth of a second uplink of the plurality of uplinks.

22. The method of claim 14, further comprising:
sending, to the first base station and for the uplink selection, a load status value associated with one or more uplinks of the plurality of uplinks,
wherein the receiving the uplink signal via the selected uplink comprises receiving, via the selected uplink, a random access preamble.

23. The method of claim 14, further comprising sending, to the first base station, at least one of:
physical resource block usage information;
first physical resource block usage information for guaranteed bit rate packets; or
second physical resource block usage information for non-guaranteed bit rate packets.

24. A first base station comprising:
one or more processors; and
memory storing instructions that, when executed by the one or more processors, cause the first base station to:
 receive, from a second base station, a first message comprising uplink configuration parameters for a cell, of the second base station, that comprises a plurality of uplinks;
 receive, from a wireless device, a measurement report associated with at least one signal of the cell; and
 send, based on the measurement report and a threshold value associated with uplink selection among the plurality of uplinks, a request to handover the wireless device to a selected uplink of the plurality of uplinks.

25. The first base station of claim 24, wherein the instructions, when executed by the one or more processors, cause the first base station to send the request by at least one of:
sending, to the wireless device, a first indication of the selected uplink for random access; or
sending, to the second base station, a second indication of the selected uplink for random access, and
wherein the instructions, when executed by the one or more processors, cause the first base station to send the request further based on a load status value associated with one or more uplinks of the plurality of uplinks.

26. The first base station of claim 24, wherein the instructions, when executed by the one or more processors, cause the first base station to receive, from the second base station, at least one of:
first radio resource status information of a first uplink of the plurality of uplinks; or
second radio resource status information of a second uplink of the plurality of uplinks.

27. The first base station of claim 24, wherein the instructions, when executed by the one or more processors, cause the first base station to send the request further based on at least one of:
first radio resource status information of a first uplink of the plurality of uplinks; or
second radio resource status information of a second uplink of the plurality of uplinks.

28. The first base station of claim 24, wherein the selected uplink comprises a normal uplink carrier of the cell or a supplemental uplink carrier of the cell.

29. The first base station of claim 24, wherein the instructions, when executed by the one or more processors, cause the first base station to send, to the wireless device and based on the first message, one or more measurement configuration parameters associated with the cell, and wherein the first message comprises the threshold value.

30. The first base station of claim 24, wherein the first message comprises at least one of:
a first physical random access channel frequency offset for a random access preamble transmission via a first uplink of the plurality of uplinks; or
a second physical random access channel frequency offset for a random access preamble transmission via a second uplink of the plurality of uplinks.

31. The first base station of claim 24, wherein the instructions, when executed by the one or more processors, cause the first base station to:
receive, from the second base station, radio resource status information of the plurality of uplinks, wherein the radio resource status information indicates:
first physical resource block (PRB) usage information;
second PRB usage information for guaranteed bit rate packets; and
third PRB usage information for non-guaranteed bit rate packets, and
wherein the instructions, when executed by the one or more processors, cause the first base station to send the request further based on the radio resource status information.

32. The first base station of claim 24, wherein the threshold value comprises at least one of:
a power threshold for a high-speed wireless device;
a power threshold for a non-high-speed wireless device;
a power threshold for a wireless device for an ultra-reliable and low latency service; or
a power threshold for a wireless device not requiring an ultra-reliable and low latency service.

33. The first base station of claim 24, wherein the uplink configuration parameters indicate:
a first frequency bandwidth of a first uplink of the plurality of uplinks; and
a second frequency bandwidth of a second uplink of the plurality of uplinks.

34. The first base station of claim 24, wherein the instructions, when executed by the one or more processors, cause the first base station to determine, based on the measurement report indicating a value greater than the threshold value, to send the request to handover the wireless device to the selected uplink of the plurality of uplinks.

35. The first base station of claim 24, wherein the instructions, when executed by the one or more processors, cause the first base station to:
select, based on a latency service associated with the wireless device, an uplink, of the plurality of uplinks, as the selected uplink, and
wherein the threshold value is received from the second base station and indicates a threshold value associated with the latency service.

36. The first base station of claim 24, wherein the instructions, when executed by the one or more processors, cause the first base station to:
select, based on a moving speed of the wireless device, an uplink, of the plurality of uplinks, as the selected uplink, and
wherein the threshold value is received from the second base station and indicates a threshold value associated with the moving speed.

37. A second base station comprising:
one or more processors; and
memory storing instructions that, when executed by the one or more processors, cause the second base station to:
send, to a first base station, a first message comprising uplink configuration parameters for a cell, of the second base station, that comprises a plurality of uplinks;
send at least one reference signal via a downlink of the cell of the second base station;
receive, from the first base station, a request to handover a wireless device to a selected uplink of the plurality of uplinks, wherein the request is based on:
a threshold value associated with uplink selection among the plurality of uplinks; and
a measurement report associated with the at least one reference signal; and
receive, from the wireless device, an uplink signal via the selected uplink.

38. The second base station of claim 37, wherein the instructions, when executed by the one or more processors, cause the second base station to send, for a handover of the wireless device, a response to the uplink signal, and
wherein the handover of the wireless device is based on a load status value associated with one or more uplinks of the plurality of uplinks.

39. The second base station of claim 37, wherein the instructions, when executed by the one or more processors, cause the second base station to send, to the first base station, at least one of:
first radio resource status information of a first uplink of the plurality of uplinks; or
second radio resource status information of a second uplink of the plurality of uplinks.

40. The second base station of claim 37, wherein the selected uplink comprises a normal uplink carrier of the cell or a supplemental uplink carrier of the cell.

41. The second base station of claim 37, wherein the first message comprises at least one of:
a first physical random access channel frequency offset for a random access preamble transmission via a first uplink of the plurality of uplinks; or
a second physical random access channel frequency offset for a random access preamble transmission via a second uplink of the plurality of uplinks.

42. The second base station of claim 37, wherein the instructions, when executed by the one or more processors, cause the second base station to:
send, to the first base station, radio resource status information of the plurality of uplinks, wherein the radio resource status information indicates:
first physical resource block (PRB) usage information;
second PRB usage information for guaranteed bit rate packets; and
third PRB usage information for non-guaranteed bit rate packets, and
wherein the request is further based on the radio resource status information.

43. The second base station of claim 37, wherein the threshold value comprises at least one of:
a power threshold for a high-speed wireless device;
a power threshold for a non-high-speed wireless device;
a power threshold for a wireless device for an ultra-reliable and low latency service; or
a power threshold for a wireless device not requiring an ultra-reliable and low latency service.

44. The second base station of claim 37, wherein the uplink configuration parameters indicate:

a first frequency bandwidth of a first uplink of the plurality of uplinks; and
a second frequency bandwidth of a second uplink of the plurality of uplinks.

45. The second base station of claim 37, wherein the instructions, when executed by the one or more processors, cause the second base station to:
send, to the first base station and for the uplink selection, a load status value associated with one or more uplinks of the plurality of uplinks, and
wherein the instructions, when executed by the one or more processors, cause the second base station to receive the uplink signal via the selected uplink by receiving, via the selected uplink, a random access preamble.

46. The second base station of claim 37, wherein the instructions, when executed by the one or more processors, cause the second base station to send, to the first base station, at least one of:
physical resource block usage information;
first physical resource block usage information for guaranteed bit rate packets; or
second physical resource block usage information for non-guaranteed bit rate packets.

47. A non-transitory computer-readable medium storing instructions that, when executed, configure a first base station to:
receive, from a second base station, a first message comprising uplink configuration parameters for a cell, of the second base station, that comprises a plurality of uplinks;
receive, from a wireless device, a measurement report associated with at least one signal of the cell; and
send, based on the measurement report and a threshold value associated with uplink selection among the plurality of uplinks, a request to handover the wireless device to a selected uplink of the plurality of uplinks.

48. The non-transitory computer-readable medium of claim 47, wherein the instructions, when executed, further configure the first base station to send the request by at least one of:
sending, to the wireless device, a first indication of the selected uplink for random access; or
sending, to the second base station, a second indication of the selected uplink for random access, and
wherein the instructions, when executed, further configure the first base station to send the request further based on a load status value associated with one or more uplinks of the plurality of uplinks.

49. The non-transitory computer-readable medium of claim 47, wherein the instructions, when executed, further configure the first base station to receive, from the second base station, at least one of:
first radio resource status information of a first uplink of the plurality of uplinks; or
second radio resource status information of a second uplink of the plurality of uplinks.

50. The non-transitory computer-readable medium of claim 47, wherein the instructions, when executed, further configure the first base station to send the request further based on at least one of:
first radio resource status information of a first uplink of the plurality of uplinks; or
second radio resource status information of a second uplink of the plurality of uplinks.

51. The non-transitory computer-readable medium of claim 47, wherein the selected uplink comprises a normal uplink carrier of the cell or a supplemental uplink carrier of the cell.

52. The non-transitory computer-readable medium of claim 47, wherein the instructions, when executed, further configure the first base station to send, to the wireless device and based on the first message, one or more measurement configuration parameters associated with the cell, and
wherein the first message comprises the threshold value.

53. The non-transitory computer-readable medium of claim 47, wherein the first message comprises at least one of:
a first physical random access channel frequency offset for a random access preamble transmission via a first uplink of the plurality of uplinks; or
a second physical random access channel frequency offset for a random access preamble transmission via a second uplink of the plurality of uplinks.

54. The non-transitory computer-readable medium of claim 47, wherein the instructions, when executed, further configure the first base station to:
receive, from the second base station, radio resource status information of the plurality of uplinks, wherein the radio resource status information indicates:
first physical resource block (PRB) usage information;
second PRB usage information for guaranteed bit rate packets; and
third PRB usage information for non-guaranteed bit rate packets, and
wherein the instructions, when executed, further configure the first base station to send the request further based on the radio resource status information.

55. The non-transitory computer-readable medium of claim 47, wherein the threshold value comprises at least one of:
a power threshold for a high-speed wireless device;
a power threshold for a non-high-speed wireless device;
a power threshold for a wireless device for an ultra-reliable and low latency service; or
a power threshold for a wireless device not requiring an ultra-reliable and low latency service.

56. The non-transitory computer-readable medium of claim 47, wherein the uplink configuration parameters indicate:
a first frequency bandwidth of a first uplink of the plurality of uplinks; and
a second frequency bandwidth of a second uplink of the plurality of uplinks.

57. The non-transitory computer-readable medium of claim 47, wherein the instructions, when executed, further configure the first base station to determine, based on the measurement report indicating a value greater than the threshold value, to send the request to handover the wireless device to the selected uplink of the plurality of uplinks.

58. The non-transitory computer-readable medium of claim 47, wherein the instructions, when executed, further configure the first base station to:
select, based on a latency service associated with the wireless device, an uplink, of the plurality of uplinks, as the selected uplink, and
wherein the threshold value is received from the second base station and indicates a threshold value associated with the latency service.

59. The non-transitory computer-readable medium of claim 47, wherein the instructions, when executed, further configure the first base station to:

select, based on a moving speed of the wireless device, an uplink, of the plurality of uplinks, as the selected uplink, and wherein the threshold value is received from the second base station and indicates a threshold value associated with the moving speed.

60. A non-transitory computer-readable medium storing instructions that, when executed, configure a second base station to:

send, to a first base station, a first message comprising uplink configuration parameters for a cell, of the second base station, that comprises a plurality of uplinks;

send at least one reference signal via a downlink of the cell of the second base station;

receive, from the first base station, a request to handover a wireless device to a selected uplink of the plurality of uplinks, wherein the request is based on:

a threshold value associated with uplink selection among the plurality of uplinks; and a measurement report associated with the at least one reference signal; and receive, from the wireless device, an uplink signal via the selected uplink.

61. The non-transitory computer-readable medium of claim 60, wherein the instructions, when executed, further configure the second base station to send, for a handover of the wireless device, a response to the uplink signal, and wherein the handover of the wireless device is based on a load status value associated with one or more uplinks of the plurality of uplinks.

62. The non-transitory computer-readable medium of claim 60, wherein the instructions, when executed, further configure the second base station to send, to the first base station, at least one of:

first radio resource status information of a first uplink of the plurality of uplinks; or second radio resource status information of a second uplink of the plurality of uplinks.

63. The non-transitory computer-readable medium of claim 60, wherein the selected uplink comprises a normal uplink carrier of the cell or a supplemental uplink carrier of the cell.

64. The non-transitory computer-readable medium of claim 60, wherein the first message comprises at least one of:

a first physical random access channel frequency offset for a random access preamble transmission via a first uplink of the plurality of uplinks; or a second physical random access channel frequency offset for a random access preamble transmission via a second uplink of the plurality of uplinks.

65. The non-transitory computer-readable medium of claim 60, wherein the instructions, when executed, further configure the second base station to:

send, to the first base station, radio resource status information of the plurality of uplinks, wherein the radio resource status information indicates:

first physical resource block (PRB) usage information;

second PRB usage information for guaranteed bit rate packets; and third PRB usage information for non-guaranteed bit rate packets, and wherein the request is further based on the radio resource status information.

66. The non-transitory computer-readable medium of claim 60, wherein the threshold value comprises at least one of:

a power threshold for a high-speed wireless device;

a power threshold for a non-high-speed wireless device;

a power threshold for a wireless device for an ultra-reliable and low latency service; or a power threshold for a wireless device not requiring an ultra-reliable and low latency service.

67. The non-transitory computer-readable medium of claim 60, wherein the uplink configuration parameters indicate:

a first frequency bandwidth of a first uplink of the plurality of uplinks; and a second frequency bandwidth of a second uplink of the plurality of uplinks.

68. The non-transitory computer-readable medium of claim 60, wherein the instructions, when executed, further configure the second base station to:

send, to the first base station and for the uplink selection, a load status value associated with one or more uplinks of the plurality of uplinks, and wherein the instructions, when executed, further configure the second base station to receive the uplink signal via the selected uplink by receiving, via the selected uplink, a random access preamble.

69. The non-transitory computer-readable medium of claim 60, wherein the instructions, when executed, further configure the second base station to send, to the first base station, at least one of:

physical resource block usage information;

first physical resource block usage information for guaranteed bit rate packets; or second physical resource block usage information for non-guaranteed bit rate packets.

70. A system comprising:

a first base station; and a second base station;

wherein the second base station is configured to:

send, to the first base station, a first message comprising uplink configuration parameters for a cell, of the second base station, that comprises a plurality of uplinks; and wherein the first base station is configured to:

receive, from a wireless device, a measurement report associated with at least one signal of the cell; and send, based on the measurement report and a threshold value associated with uplink selection among the plurality of uplinks, a request to handover the wireless device to a selected uplink of the plurality of uplinks.

71. The system of claim 70, wherein the first base station is further configured to send the request by at least one of:

sending, to the wireless device, a first indication of the selected uplink for random access; or sending, to the second base station, a second indication of the selected uplink for random access, and wherein the first base station is further configured to send the request further based on a load status value associated with one or more uplinks of the plurality of uplinks.

72. The system of claim 70, wherein the second base station is further configured to send, to the first base station, at least one of:

first radio resource status information of a first uplink of the plurality of uplinks; or second radio resource status information of a second uplink of the plurality of uplinks.

73. The system of claim 70, wherein the first base station is further configured to send the request further based on at least one of:
- first radio resource status information of a first uplink of the plurality of uplinks; or
- second radio resource status information of a second uplink of the plurality of uplinks.

74. The system of claim 70, wherein the selected uplink comprises a normal uplink carrier of the cell or a supplemental uplink carrier of the cell.

75. The system of claim 70, wherein the first base station is further configured to send, to the wireless device and based on the first message, one or more measurement configuration parameters associated with the cell, and
wherein the first message comprises the threshold value.

76. The system of claim 70, wherein the first message comprises at least one of:
- a first physical random access channel frequency offset for a random access preamble transmission via a first uplink of the plurality of uplinks; or
- a second physical random access channel frequency offset for a random access preamble transmission via a second uplink of the plurality of uplinks.

77. The system of claim 70, wherein the second base station is further configured to:
- send, to the first base station, radio resource status information of the plurality of uplinks, wherein the radio resource status information indicates:
  - first physical resource block (PRB) usage information;
  - second PRB usage information for guaranteed bit rate packets; and
  - third PRB usage information for non-guaranteed bit rate packets, and
- wherein the first base station is further configured to send the request further based on the radio resource status information.

78. The system of claim 70, wherein the threshold value comprises at least one of:
- a power threshold for a high-speed wireless device;
- a power threshold for a non-high-speed wireless device;
- a power threshold for a wireless device for an ultra-reliable and low latency service; or
- a power threshold for a wireless device not requiring an ultra-reliable and low latency service.

79. The system of claim 70, wherein the uplink configuration parameters indicate:
- a first frequency bandwidth of a first uplink of the plurality of uplinks; and
- a second frequency bandwidth of a second uplink of the plurality of uplinks.

80. The system of claim 70, wherein the first base station is further configured to determine, based on the measurement report indicating a value greater than the threshold value, to send the request to handover the wireless device to the selected uplink of the plurality of uplinks.

81. The system of claim 70, wherein the first base station is further configured to:
- select, based on a latency service associated with the wireless device, an uplink, of the plurality of uplinks, as the selected uplink, and
- wherein the threshold value is received from the second base station and indicates a threshold value associated with the latency service.

82. The system of claim 70, wherein the first base station is further configured to:
- select, based on a moving speed of the wireless device, an uplink, of the plurality of uplinks, as the selected uplink, and
- wherein the threshold value is received from the second base station and indicates a threshold value associated with the moving speed.

* * * * *